United States Patent
Shiizaki et al.

(10) Patent No.: US 11,265,867 B2
(45) Date of Patent: Mar. 1, 2022

(54) WIRELESS COMMUNICATION SYSTEM, WIRELESS BASE STATION, WIRELESS TERMINAL, AND WIRELESS COMMUNICATION METHOD

(71) Applicant: FUJITSU CONNECTED TECHNOLOGIES LIMITED, Kawasaki (JP)

(72) Inventors: Kotaro Shiizaki, Kawasaki (JP); Akira Ito, San Jose, CA (US)

(73) Assignee: FUJITSU CONNECTED TECHNOLOGIES LIMITED, Kawasaki (JP)

( * ) Notice: Subject to any disclaimer, the term of this patent is extended or adjusted under 35 U.S.C. 154(b) by 0 days.

(21) Appl. No.: 16/863,264

(22) Filed: Apr. 30, 2020

(65) Prior Publication Data

US 2020/0260425 A1     Aug. 13, 2020

Related U.S. Application Data

(63) Continuation of application No. 15/015,702, filed on Feb. 4, 2016, now Pat. No. 10,708,896, which is a
(Continued)

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0035* (2013.01); *H04L 5/0055* (2013.01);
(Continued)

(58) Field of Classification Search
None
See application file for complete search history.

(56) References Cited

U.S. PATENT DOCUMENTS

2010/0124200 A1* 5/2010 Ergen ................ H04W 36/0016
                                                                370/331
2011/0019776 A1   1/2011 Zhang et al.
(Continued)

FOREIGN PATENT DOCUMENTS

EP          2 381 735 A1    10/2011
KR    10-2010-0107393 A     10/2010
(Continued)

OTHER PUBLICATIONS

3GPP TS 36.211 V10.4.0,3rd Generation Partnership Project; Technical Specification Group Radio Access Network Evolved Universal Terrestrial Radio Access (E-UTRA); Physical Channels and Modulation (Release 10), Dec. 2011.
(Continued)

*Primary Examiner* — Gregory B Sefcheck
*Assistant Examiner* — Srinivasa R Reddivalam
(74) *Attorney, Agent, or Firm* — Myers Wolin, LLC

(57) ABSTRACT

A wireless base station, includes: a wireless transceiver configured to transmit to a wireless terminal a downlink frame including a downlink control information, the wireless downlink control information includes information representing a specified offset, wherein the wireless transceiver is further configured to receive an uplink frame from the wireless terminal; and a processor circuit coupled to the wireless transceiver and configured to determine uplink control information from the uplink frame, the uplink control information being offset by at least the specified offset from a location in the uplink frame that is the same as a location where the downlink control information was located in the downlink frame.

4 Claims, 15 Drawing Sheets

Related U.S. Application Data continuation of application No. 14/487,664, filed on Sep. 16, 2014, now abandoned, which is a continuation of application No. PCT/JP2012/001907, filed on Mar. 19, 2012.

(51) Int. Cl.
  *H04W 72/12* (2009.01)
  *H04L 1/18* (2006.01)

(52) U.S. Cl.
  CPC ....... *H04L 5/0094* (2013.01); *H04W 72/0406* (2013.01); *H04W 72/0413* (2013.01); *H04W 72/1268* (2013.01); *H04L 1/1861* (2013.01); *H04L 5/0073* (2013.01)

(56) References Cited

U.S. PATENT DOCUMENTS

| | | | | |
|---|---|---|---|---|
| 2011/0274073 | A1* | 11/2011 | Sumasu | H04W 72/1284 370/329 |
| 2011/0292900 | A1 | 12/2011 | Ahn et al. | |
| 2012/0020319 | A1* | 1/2012 | Song | H04B 7/0632 370/330 |
| 2012/0034927 | A1* | 2/2012 | Papasakellariou | H04W 52/32 455/450 |
| 2012/0044870 | A1 | 2/2012 | Mochizuki et al. | |
| 2012/0076040 | A1 | 3/2012 | Hoshino et al. | |
| 2012/0127949 | A1* | 5/2012 | Yoshimoto | H04L 1/0077 370/329 |
| 2012/0195284 | A1* | 8/2012 | Mann | H04L 1/1819 370/329 |
| 2012/0230273 | A1* | 9/2012 | He | H04W 56/0045 370/329 |
| 2013/0195065 | A1* | 8/2013 | Park | H04L 5/0055 370/329 |
| 2015/0092723 | A1* | 4/2015 | Ahn | H04L 1/1607 370/329 |

FOREIGN PATENT DOCUMENTS

| | | | |
|---|---|---|---|
| WO | 2006/103099 | A1 | 10/2006 |
| WO | 2010101411 | A2 | 9/2010 |
| WO | 2010/125738 | | 11/2010 |
| WO | 2010/140298 | | 12/2010 |
| WO | WO-2011016489 | A1 * | 2/2011 ........... H04L 5/0073 |

OTHER PUBLICATIONS

3GPP TS 36.213 V10.4.0,3GPP, 3rd Generation Partnership Project; Technical Specification Group Radio Access Network; Evolved Universal Terrestrial Radio Access (E-UTRA); Physical layer procedures (Release 10), Dec. 2012.
3GPP TR 36.814 V9.0.0,3GPP, 3rd Generation Partnership Project; Technical Specification Group Radio Access Network; Evolved Universal Terrestrial Radio Access (E-UTRA); Further advancements for E-UTRA physical layer aspects (Release 9), Mar. 2010.
3GPP TR 36.819 V11.0.0,3GPP, 3rd Generation Partnership Project; Technical Specification Group Radio Access Network; Coordinated multi-point operation for LTE physical layer aspects (Release 11), Sep. 2011.
Nokia Siemens Networks, Nokia, "On Reference Signal Enhancements for UL CoMP", 3GPP TSG RAN WG1 Meeting #67, San Francisco, USA, Nov. 14-18, 2011, R1-114324.
International Search Report issued for corresponding International Patent Application No. PCT/JP2012/001907, dated May 22, 2012, English translation attached.
LG Electronics, "PUCCH resource management for UL CoMP", 3GPP TSG RAN WG1 Meeting #67, San Francisco, USA, Nov. 14-18, 2011, R1-113990.
Samsung, "PUCCH HARQ-ACK Resource Mapping for DL CA", Agenda Item: 6.2.4.1, 3GPP TSG RAN WG1 #61 bis, R1-103637, pp. 1-3, 3rd Generation Partnership Project (3GPP), Dresden, Germany, Jun. 28-Jul. 2, 2010.
QUALCOMM Incorporated, "Uplink control signaling for CoMP", Agenda Item: 7.5.4.4, 3GPP TSG RAN WG1 #66bis, R1-113392, pp. 1-3, 3rd Generation Partnership Project (3GPP), Zhuhai, China, Oct. 10 -14, 2011.
LG Electronics, "Resource Allocation for Multi-antenna Transmission in PUCCH Format 1/1a/1b", Agenda Item 7.1.6, 3GPP TSG RAN WG1 #59 bis, R1-100644, pp. 1-4, 3rd Generation Partnership Project (3GPP), Valencia, Spain, Jan. 18-22, 2010.
LG Electronics, "Resource allocation for UL ACK/NACK", Agenda Item: 6.2.2.3, 3GPP TSG RAN WG1 #62, R1-105025, pp. 1-6, 3rd Generation Partnership Project (3GPP), Madrid, Spain, Aug. 23-27, 2010.
Extended European search report with supplementary European search report and European search opinion issued for corresponding European Patent Application No. 12871895.4 dated Feb. 9, 2015.
Notice of Preliminary Rejection issued for corresponding Korean Patent Application No. 10-2014-7025873 dated Aug. 20, 2015 with an English translation.
QUALCOMM Incorporated, "UL ACK for MC operation", Agenda Item: 7.1.4, 3GPP TSG RAN WG1 #60, R1-101477, 3rd Generation Partnership Project (3GPP), San Francisco, CA (US), Feb. 22-26, 2010.
Notification of Reasons for Refusal issued for corresponding Japanese Patent Application No. 2014-505790 dispatched on Nov. 10, 2015 with a partial English translation.
Office Action issued by the Russian Federation Patent Office dated Nov. 25, 2015 for corresponding Russian patent application No. 2014142024/07(068052), English translation attached.
Office Action issued for corresponding Canadian Patent Application No. 2,867,670 dated Dec. 4, 2015.
Non-Final Office Action issued by the United States Patent and Trademark Office for corresponding U.S. Appl. No. 15/015,702, electronically delivered on Jun. 8, 2016.
Non-Final Office Action issued by the United States Patent and Trademark Office for corresponding U.S. Appl. No. 14/487,664, electronically delivered on Jul. 7, 2016.
Final Office Action issued by the United States Patent and Trademark Office for corresponding U.S. Appl. No. 15/015,702, electronically delivered on Dec. 16, 2016.
Office Action issued for corresponding Canadian Patent Application No. 2,867,670 dated Nov. 15, 2016.
Final Office Action issued by the United States Patent and Trademark Office for corresponding U.S. Appl. No. 14/487,664, electronically delivered on Jan. 10, 2017.
Advisory Action Before the Filing of an Appeal Brief issued by the United States Patent and Trademark Office for corresponding U.S. Appl. No. 15/015,702, electronically delivered on Mar. 24, 2017.
QUALCOMM Incorporated, "Uplink control signaling for CoMP", Agenda Item: 7.5.4.3, 3GPP TSG-RAN WG1 Meeting #67, R1-114118, San Francisco, CA, USA, Nov. 14-18, 2011.
ZTE, "Consideration for PUCCH enhancement for CoMP", Agenda Item: 7.5.6.3, 3GPP TSG-RAN WG1 Meeting #68, R1-120311, Dresden, Germany, Feb. 6-10, 2012.
Notice of Preliminary Rejection issued by the Korean Intellectual Property Office for corresponding Korean Patent Application No. 10-2016-7025926, dated Apr. 17, 2017, with English translation.
Advisory Action issued by the United States Patent and Trademark Office for corresponding U.S. Appl. No. 14/487,664, electronically delivered on Mar. 24, 2017.
Notice of Final Rejection issued by the Korean Intellectual Property Office for corresponding Korean Patent Application No. 10-2016-7025926, dated Sep. 5, 2017, with English translation.
Examiner's Answer issued by the United States Patent and Trademark Office for corresponding U.S. Appl. No. 15/015,702, electronically delivered on Nov. 1, 2017.
Office Action issued by the Canadian Intellectual Property Office for corresponding Canadian Patent Application No. 2,867,670, dated Oct. 30, 2017.

(56) References Cited

OTHER PUBLICATIONS

Office Action issued by Rospatent Federal Service for Intellectual Property for corresponding Russian Patent Application No. 2017114491/07(025255), dated Jan. 22, 2018, with an English translation.
Communication pursuant to Article 94(3) EPC issued by the European Patent Office for corresponding European Patent Application No. 12 871 895.4-1207, dated Mar. 6, 2018.
Patent Board Decision on Appeal issued by the United States Patent and Trademark Office for corresponding U.S. Appl. No. 15/015,702, electronically delivered on Nov. 7, 2018.
Non-Final Office Action issued by the United States Patent and Trademark Office for corresponding U.S. Appl. No. 15/015,702, electronically delivered on Feb. 6, 2019.
Final Office Action issued by the United States Patent and Trademark Office for corresponding U.S. Appl. No. 15/015,702, electronically delivered on Aug. 27, 2019.
Advisory Action Before the Filing of an Appeal Brief issued by the United States Patent and Trademark Office for corresponding U.S. Appl. No. 15/015,702, electronically delivered on Jan. 30, 2020.
Notice of Allowance issued by the United States Patent and Trademark Office for corresponding U.S. Appl. No. 15/015,702, electronically delivered on Mar. 10, 2020.
Communication pursuant to Article 94(3) EPC issued by the European Patent Office for corresponding European Patent Application No. 12 871 895.4, dated Sep. 1, 2020.

\* cited by examiner

FIG. 4

| RB ASSIGNMENT | MCS | RV·NDI | HARQ PROCESSING NUMBER | PUCCH POWER CONTROL | RNTI |

FIG. 10

| RB ASSIGNMENT | MCS | RV·NDI | HARQ PROCESSING NUMBER | PUCCH POWER CONTROL | RNTI | RESOURCE OFFSET |

FIG. 15A

| RB ASSIGNMENT | MCS | RV-NDI | HARQ PROCESSING NUMBER | PUCCH POWER CONTROL | RNTI | UL SENDING DESTINATION IDENTIFIER |
|---|---|---|---|---|---|---|

FIG. 15B

| RB ASSIGNMENT | MCS | RV-NDI | HARQ PROCESSING NUMBER | PUCCH POWER CONTROL | RNTI | UL SENDING DESTINATION IDENTIFIER | RESOURCE OFFSET |
|---|---|---|---|---|---|---|---|

WIRELESS COMMUNICATION SYSTEM, WIRELESS BASE STATION, WIRELESS TERMINAL, AND WIRELESS COMMUNICATION METHOD

CROSS-REFERENCE TO RELATED APPLICATION

This application is a continuation application of U.S. application Ser. No. 15/015,702, filed Feb. 4, 2016, now pending, which is a continuation application of U.S. application Ser. No. 14/487,664, filed Sep. 16, 2014, now abandoned, which is a continuation application of International Application No. PCT/JP2012/001907, filed on Mar. 19, 2012, the entire contents of each are incorporated herein by reference.

FIELD

The present invention relates to a wireless communication system, a wireless terminal, a wireless base station, and a wireless communication method.

BACKGROUND

In recent years, in an attempt to further increase speed and capacity of wireless communication in a wireless communication system, such as a mobile phone system (cellular system), discussions are held on wireless communication technology for the next generation. For example, in the 3GPP (3rd generation partnership project), which is a standards organization, a communication standard called as LTE (long term evolution) and a communication standard called as LTE-A (LTE-advanced) based on the wireless communication technique of LTE are suggested.

The latest communication standard completed in the 3GPP is Release 10 compatible with LTE-A, in which Releases 8 and 9 compatible with LTE are greatly functionally enhanced. Currently, discussions are held for completion of Release 11, in which Release 10 is further enhanced. In the descriptions below, "LTE" includes, in addition to LTE and LTE-A, other wireless communication systems that are made by enhancing LTE unless otherwise noted.

In Release 11 of the 3GPP, coordinated multiple point (CoMP) is one of the techniques that are discussed actively in particular. Simply put, CoMP is a technique to coordinate sending and receiving to a wireless terminal (UE: user equipment) between different wireless base stations (eNB: evolved node B). In the following descriptions, a wireless link in a direction from a wireless terminal to a wireless base station is called as an uplink (UL) and a wireless link in a direction from a wireless base station to a wireless terminal is called as a downlink (DL).

There are several forms of CoMP, and a scenario is known in which a wireless terminal carries out communication with different wireless base stations for UL and DL. In a regular case, a wireless terminal carries out communication with an identical wireless base station for UL and DL. That is, it is common that a wireless terminal carries out communication with a connected wireless base station (serving cell). As an example, a wireless terminal receives UL scheduling information from a connected wireless base station on a DL and sends data to the connected wireless base station on a UL based on the received UL scheduling information. As another example, a wireless terminal receives data from a connected wireless base station on a DL and sends a response signal (ACK signal or NACK signal) to the received data to the connected wireless base station on a UL.

However, there is sometimes another wireless base station whose communication quality of UL for the wireless terminal is higher than the connected wireless base station. Even when certain communication quality of DL (receiving quality, propagation delay, and the like) is secured, in such a case that a wireless terminal is located at a cell edge, the communication quality of UL may not be good. When there is another wireless base station whose communication quality of DL is higher than the connected wireless base station, the connected wireless base station of the wireless terminal is switched by handover, so that this is out of the problem.

Such problem easily occurs as well in a so-called heterogeneous network, for example, where macrocells, which are regular base stations, and picocells and the like (also microcells, femtocells, and the like), which are small base stations, are mixed. In a heterogeneous network, a picocell is desired to suppress the DL cell size (suppress the sending power) in order to inhibit interference in a macrocell. That is, a macrocell and a picocell greatly differ in DL cell size (sending power). Therefore, a situation may occur that, for a wireless terminal located at a cell edge of the connected macrocell, the DL quality is better with a macrocell while the UL quality is better with a picocell.

In the 3GPP, in view of such problems, a scenario is under review in which a wireless terminal carries out communication with different wireless base stations for UL and DL as described above. In this scenario, when there is another wireless base station whose communication quality of UL for a wireless terminal is higher than the connected wireless base station, the wireless terminal carries out UL communication with the base station different from the connected wireless base station. As an example, it is possible that the wireless terminal receives UL scheduling information from the connected wireless base station on a DL and sends data to a base station different from the connected wireless base station on a UL based on the received UL scheduling information. As another example, it is possible that a wireless terminal receives data from the connected wireless base station on a DL and sends a response signal to the received data to a base station different from the connected wireless base station on a UL. In such a manner, it becomes possible to secure the UL wireless communication quality to a wireless terminal that has poor UL wireless quality with the connected wireless base station. Then, as a result, an effect of improving transmission efficiency of the entire system is expected.

Non Patent Literatures 3GPP TS36.211 V10.4.0 (2011-12), 3GPP TS36.213 V10.4.0 (2011-12), 3GPP TR36.814 V9.0.0 (2010-03), 3GPP TR36.819 V11.0.0 (2011-09), 3GPP R1-114324 "On Reference Signal Enhancements for UL CoMP" (2011-11) are examples of the related art.

SUMMARY

According to an aspect of the invention, a wireless communication system includes a wireless base station, and a wireless terminal configured to receive from the wireless base station a downlink frame including data and a downlink control signal for decoding the data, the downlink control signal being mapped to a first downlink control resource element of downlink control resource elements that are resource units used for transmissions of downlink control signals in the downlink frame, and to transmit an uplink frame including an uplink control signal for acknowledging a decoding result of the data, the uplink control signal being mapped to a first uplink control resource element of uplink control resource elements that are resource units used for transmissions of uplink control signals in the uplink frame, the first uplink control resource element being determined by shifting a second uplink control resource element of the uplink control resource elements by an offset number whose unit is one of the uplink control resource elements, the second uplink control resource element being determined based on a location of the first downlink control resource element in the downlink frame, the offset number being determined based on a first offset information included in the downlink control signal.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating one example of a DCI format in the wireless communication system of the first embodiment.

FIG. 10 is a diagram illustrating one example of a DCI format in the wireless communication system of the second embodiment.

FIG. 15A is a diagram illustrating one example of a DCI format in a wireless communication system of a seventh embodiment.

FIG. 15B is a diagram illustrating one example of a DCI format in a wireless communication system of a seventh embodiment.

DESCRIPTION OF EMBODIMENTS

Figure 1:
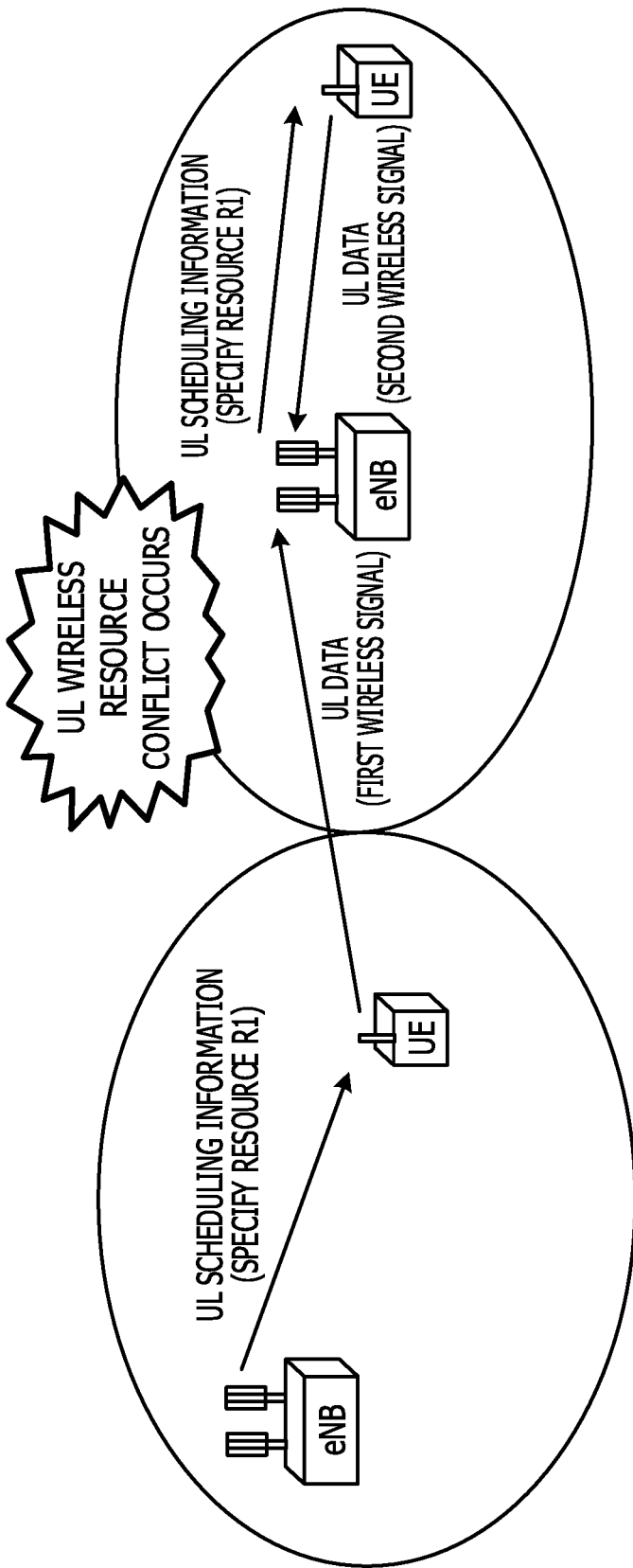
FIG. 1 is a diagram illustrating problems in conventional techniques.

When a wireless terminal and a wireless base station carry out communication, with some exceptions, scheduling of a wireless resource (hereinafter, may be referred to simply as scheduling) is carried out. Scheduling of a wireless resource is to determine a wireless resource that is used for sending and receiving of a wireless signal (to assign a wireless resource or to determine allocation of a wireless resource is synonymous). For example, a wireless resource is defined by a time component and a frequency component. Scheduling of a wireless resource is carried out by a connected wireless base station to a subordinate wireless terminal. The connected wireless base station notifies a connected wireless terminal of scheduling information related to the determined scheduling on a DL, and the connected wireless terminal and the wireless base station carry out sending and receiving of a wireless signal based on the scheduling information.

Consideration is given to the above described scheduling in the scenario where a wireless terminal carries out communication with different wireless base stations for UL and DL. Now, it is assumed that a wireless terminal is intended to send data on a UL. At this time, the wireless terminal sends a signal that requests UL scheduling to the connected wireless base station. Next, it is assumed that the connected wireless base station that has received the signal that requests UL scheduling determines to cause another wireless base station to receive UL data of the wireless terminal based on receiving quality of the wireless signal from the wireless terminal and the like.

At this time, the connected wireless base station sends UL scheduling information to the wireless terminal on a DL. The wireless terminal sends a wireless signal including UL data using a UL wireless resource that is specified by the received UL scheduling information.

Meanwhile, in parallel with the above, the connected wireless base station sends the UL scheduling information also to another wireless base station via a backhaul network (network that links between wireless base stations and a wireless base station with a core network). The other wireless base station receives a wireless signal including UL data from the wireless terminal using the wireless resource that is specified by the received UL scheduling information.

According to the above consideration, in the scenario where a wireless terminal carries out communication with different wireless base stations for UL and DL, it may also be considered that scheduling is carried out without a problem and the other wireless base station is capable of receiving data from the wireless terminal. However, in such scenario, a phenomenon is confirmed in which another wireless base station different from the connected base station is sometimes not capable of receiving data from the wireless terminal.

The disclosed technique has made in view of the above, and it is an object thereof to provide a wireless communication system, a wireless terminal, a wireless base station, and a wireless communication method that allow, when a wireless terminal carries out communication with different wireless base stations for UL and DL, another wireless base station different from the connected base station to receive data from the wireless terminal.

Descriptions are given below to embodiments of a wireless communication system, a wireless terminal, a wireless base station, and a wireless communication method of the disclosure, with reference to the drawings. Although descriptions are given as separate embodiments for convenience, it is of course possible to also obtain effects of combination by combining respective embodiments and further enhance the usability.

[a] Identification of Problem

As described above, in the scenario where a wireless terminal carries out communication with different wireless base stations for UL and DL, a phenomenon is confirmed in which another wireless base station different from the connected base station is sometimes not capable of receiving data from the wireless terminal. Keenly reviewing this phenomenon, the inventor has found that there are problems of wireless resource scheduling in the scenario. Here, before describing the respective embodiments, descriptions are given to identification of the problems that the inventor has found.

As described above, a wireless terminal sends a wireless signal including UL data (called as a first wireless signal) using a wireless resource that is specified by UL scheduling information received from the connected wireless base station. In contrast, another wireless base station receives a wireless signal including UL data from the wireless terminal based on scheduling information received from the connected wireless base station (that is, based on a wireless resource defined by the connected wireless base station). However, at this time, there is a possibility that the other wireless base station has already sent the scheduling information specifying the wireless resource to another wireless terminal connected thereto. This is because it is not possible for the other wireless base station to predict a UL reception request from the connected wireless base station in advance.

In such a case, the other wireless terminal sends a wireless signal including data (called as a second wireless signal) to the other wireless base station using the wireless resource specified by the UL scheduling information received from the other wireless base station. Thus, the wireless terminal and the other wireless terminal turn out to carry out UL sending using same wireless resources (sending time, sending frequency). In other words, the first wireless signal and the second wireless signal are sent on same wireless resources. As a result, conflict occurs in a UL wireless resource. Since the first wireless signal and the second wireless signal include different data and interfere with each other, it becomes difficult for the other wireless base station to decode any data. Accordingly, in such a case, the other wireless base station turns out not to be capable of receiving data without an error from the wireless terminal. FIG. 1 illustrates an outline of this problem.

To sum up above, in the scenario where a wireless terminal carries out communication with different wireless base stations for UL and DL, conflict of a wireless resource may occur in UL sending. Then, when conflict of a wireless resource occurs in UL sending, it is not possible that another wireless base station different from the connected base station receives data without an error from the wireless terminal. Accordingly, in the scenario where a wireless terminal carries out communication with different wireless base stations for UL and DL, there is a problem that the other wireless base station is sometimes not capable of receiving data from the wireless terminal.

In addition, when the other wireless base station is not capable of receiving data without an error (not capable of decoding data), the wireless terminal and the other wireless terminal turn out to carry out resending of data in response to reception of a NACK signal or a timeout of a response signal. Resending of data leads to a waste of wireless resources and thus is not preferred.

The technique of the disclosure has been embodied based on the findings of the above problems by the inventor.

[b] First Embodiment

Figure 2:
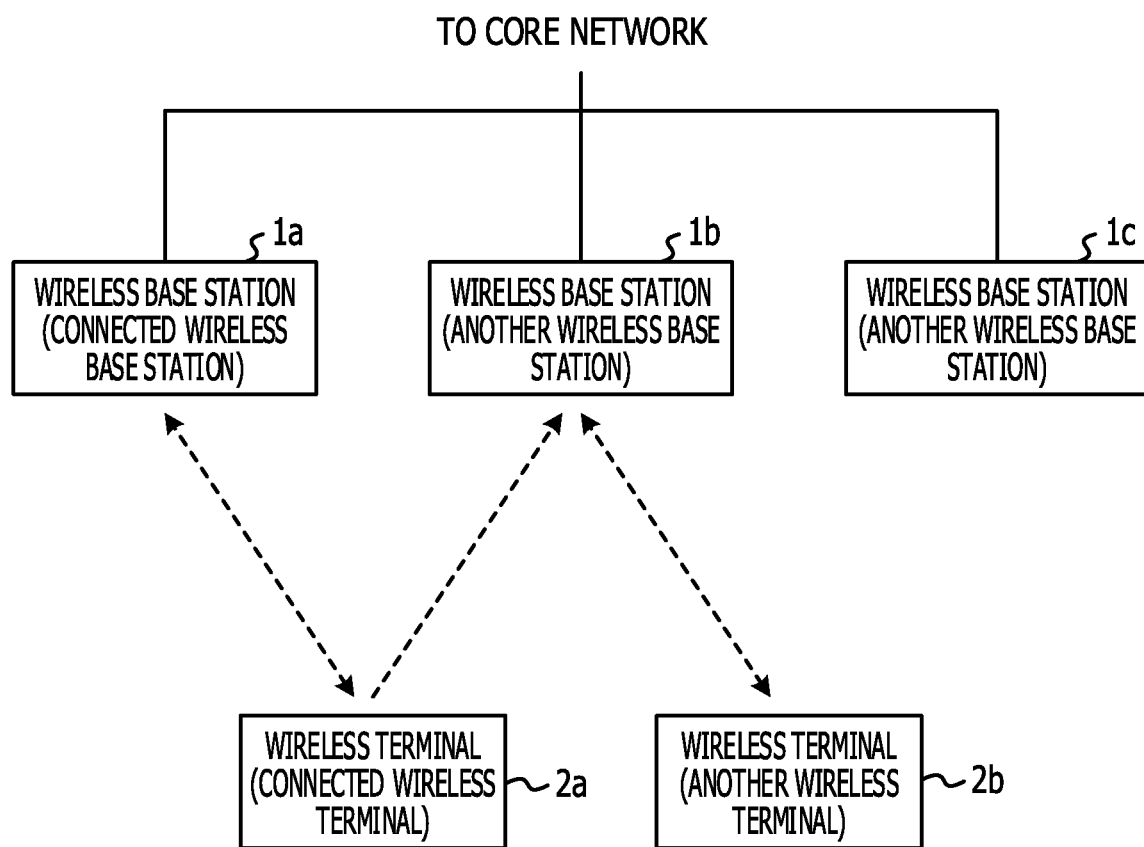
FIG. 2 is a diagram illustrating one example of a network configuration of a wireless communication system in a first embodiment.

FIG. 2 illustrates a network configuration of a wireless communication system in the first embodiment. The present embodiment is an embodiment of a wireless communication system compliant with LTE. Therefore, some of LTE specific terms and concepts appear. However, the present embodiment is merely one example and it is noted that it is applicable to a wireless communication system compliant with a communication standard other than LTE.

The wireless communication system illustrated in FIG. 2 is provided with a plurality of wireless base stations (eNB: evolved node B) 1a, 1b, 1c, wireless terminals (UE: user equipment) 2a, 2b, and the like. In the descriptions below, the plurality of wireless base stations 1a, 1b, 1c may be represented collectively as wireless base stations 1. In addition, the plurality of wireless terminals 2a, 2b may be represented collectively as wireless terminals 2.

Wireless networks between the wireless base stations and the wireless terminals are called as wireless access networks. The wireless base stations 1 are connected with a wired or wireless network (transmission network) called as a backhaul network. A backhaul network is a network that links between the wireless base stations 1 and the wireless base stations 1 with a core network. The wireless base stations 1 are capable of carrying out communication with a device connected to the core network via the backhaul network. To the core network, an MME (mobility management entity), an SAE-GW (system architecture evolution gateway), and the like that are not illustrated are connected. An LTE network may also be called as an EPS (evolved packet system). The EPS includes a eUTRAN (evolved universal terrestrial radio network), which is a wireless access network, and an EPC (evolved packet core), which is a core network. The core network may also be called as an SAE (system architecture evolution).

The wireless base stations 1 (may also be called simply as base stations) in FIG. 2 is a device that carries out wireless communication with the wireless terminals 2 via the wireless access network and also is connected to the backhaul network. The wireless base station 1a carries out sending and receiving of data with the subordinate wireless terminal 2a (may be referred to as a connected wireless terminal) and also carries out a variety of control over the wireless terminal 2a by exchanging various types of control information with the subordinate wireless terminal 2a. In addition, the wireless base station 1a carries out relay of data with the other wireless base stations 1b, 1c, each other, via the backhaul network and also is capable of cooperation by exchanging various types of control information with the other wireless base stations 1b, 1c.

The wireless base stations 1 carries out exchange of a variety of control information with a control device, such as an MME connected to the core network beyond the backhaul network, via the backhaul network. In addition, the wireless base station 1a relays the data received from the subordinate wireless terminal 2a to a relay device, such as an SAE-GW connected to the core network, and also relays the data received from the relay device, such as an SAE-GW, to the subordinate wireless terminal 2a.

The wireless base stations 1 may be connected with the backhaul network by wire and may also be connected wirelessly. In addition, the wireless base stations 1 may also have a communication function with the wireless access network as an extended RRH, which is a separate device, and connect by wire therewith.

Although a "cell" is a range that the wireless base stations 1 covers in order that the wireless terminals 2 sends and receives a wireless signal (strictly, there are UL cells and DL cells), the wireless base stations 1 and the cell are almost corresponding concepts, so that it does not matter if the "cell" and the "wireless base station" are read interchangeably as appropriate in the descriptions below.

Meanwhile, the wireless terminals 2 (may also be called simply as terminals; may also be called as user devices, subscriber stations, mobile stations, and the like) in FIG. 2 are devices that carry out wireless communication with the wireless base stations 1 via the wireless access network. The wireless terminal 2a is connected to one wireless base station 1a, and as a change occurs in a wireless state by transfer and the like, the wireless base station 1 to be connected is switched by handover. Here, while "connection" indicates that a wireless terminal is registered in (attached to) a wireless base station, it may also be interpreted to simply mean in communication. The wireless base station 1a connected by the wireless terminal 2a is called as a connected wireless base station or a serving cell. The wireless terminal 2a carries out sending and receiving of data by wireless communication with the connected wireless base station 1a and also is subject to a variety of control by exchanging various types of control information by wireless communication with the connected wireless base station 1a.

The wireless terminal 2a in the present embodiment receives a DL wireless signal from the connected wireless base station 1a. The wireless terminal 2a in the present embodiment is capable of sending a UL wireless signal to the connected wireless base station 1a or the other wireless base stations 1b, 1c. Accordingly, the wireless terminal 2a in the present embodiment is capable of carrying out communication with wireless base stations 1 different for DL and UL. Details are described later.

The wireless communication system in the present embodiment is configured with, as well as a DL wireless signal and a UL wireless signal, a wireless frame (may also be referred to simply as a frame) having a predetermined length (for example, 10 milliseconds). Further, one wireless frame is respectively configured with a predetermined number (for example, 10) of wireless subframes (may also be referred to simply as subframes) having a predetermined length (for example, 1 millisecond). Then, each subframe is further divided into each physical channel, which is a physical communication path. Since a "frame" and a "subframe" are merely terms that indicate processing units of a wireless signal, these terms may also be read interchangeably as appropriate in the following.

As a DL physical channel, there are a downlink shared channel (PDSCH: physical downlink shared channel) that is used for transmission of a DL data signal and the like, a downlink control channel (PDCCH: physical downlink control channel) that is used for transmission of a DL control signal, and the like. In a PDSCH, as well as a DL data signal, a DL reference signal for various types of measurement and the like are also mapped. Meanwhile, as a UL physical channel, there are an uplink shared channel (PUSCH: physical uplink shared channel) that is used for transmission of a UL data signal and the like, an uplink control channel (PUCCH: physical uplink control channel) that is used for transmission of a UL control signal, and the like. In PUSCH, as well as a UL data signal, a UL reference signal for various types of measurement and the like are also mapped.

Figure 3:
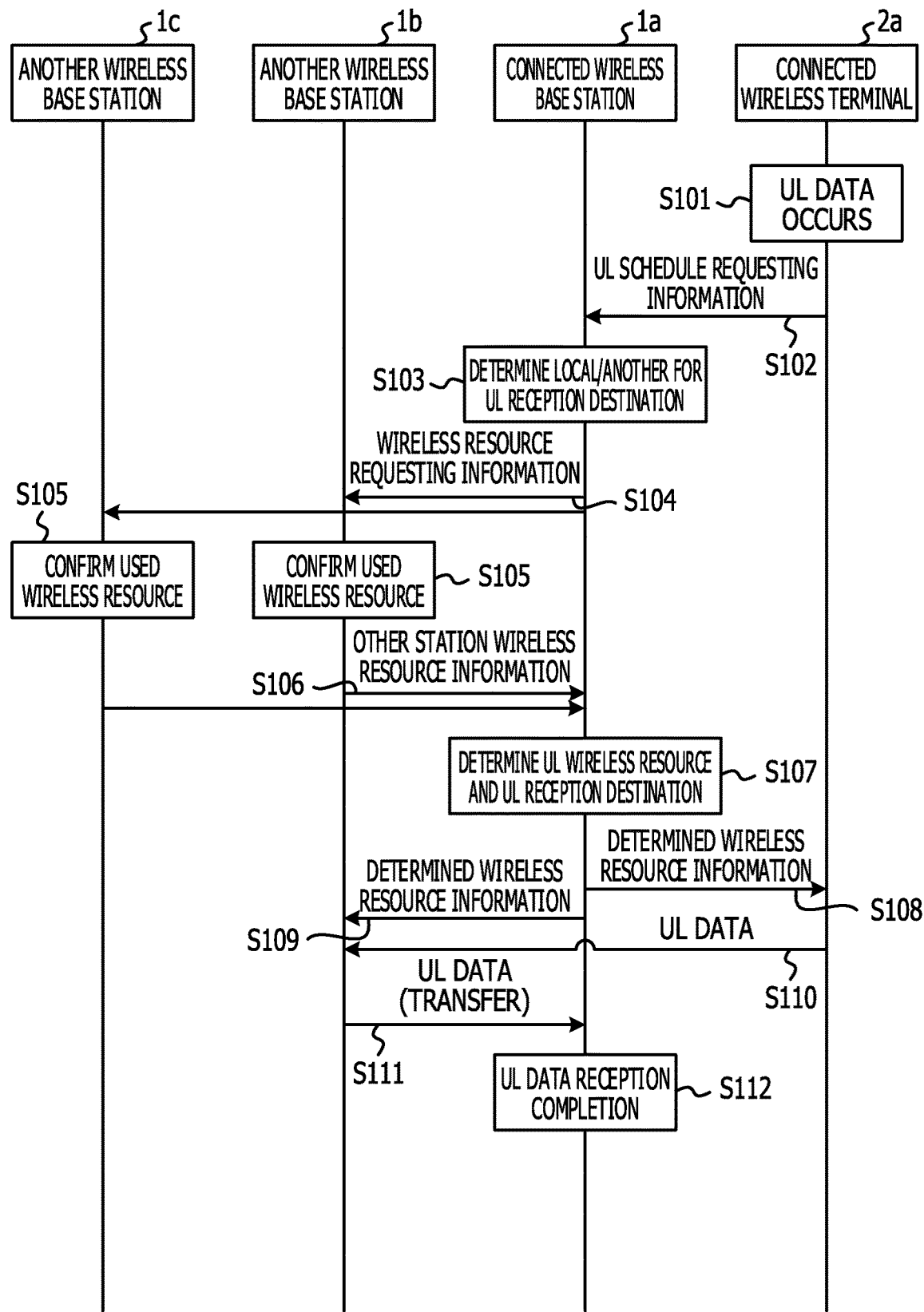
FIG. 3 is one example of a process sequence diagram of the wireless communication system in the first embodiment.

Next, based on FIG. 3, descriptions are given to a process sequence of the wireless communication system in the first embodiment. FIG. 3 is a process sequence when sending data (UL data) to the connected wireless base station 1a occurs in the wireless terminal 2a. As described before, the wireless terminal 2a in the present embodiment is capable of receiving a DL wireless signal from the connected wireless base station 1a and also sending a UL wireless signal to the connected wireless base station 1a or the other wireless base station 1b, which is another wireless base station. That is, the wireless terminal 2a is capable of carrying out communication with wireless base stations 1 different for DL and UL. FIG. 3 is one example of such asymmetric wireless communication.

In S101 in FIG. 3, UL data occurs in the wireless terminal 2a. For example, UL data occurs when an audio signal, data, and the like are sent from the wireless terminal 2a to the other wireless terminal 2b, when an application on the wireless terminal 2a sends data to a server on the Internet, and the like. As the UL data occurs, in S102, the wireless terminal 2a sends UL schedule requesting information, which is information to request a UL wireless resource in order to send the UL data, to the connected wireless base station 1a on a UL wireless signal. In the UL schedule requesting information, information indicating a UL wireless resource amount to be used (UL wireless resource amount information) is stored.

As receiving the UL schedule requesting information, the connected wireless base station 1a starts scheduling of a UL wireless resource to the wireless terminal 2a. The connected wireless base station 1a firstly obtains, for example, UL receiving quality from the wireless terminal 2a. It is possible to obtain the UL receiving quality based on a sound reference signal (SRS) included in the UL wireless signal. Then, the connected wireless base station 1a decides whether the obtained UL receiving quality satisfies a predetermined criterion. Based on this decision, in S103, the connected wireless base station 1a determines whether or not to set a base station to receive UL data as a local station (connected wireless base station 1a). When the receiving quality satisfies the predetermined criterion, the connected wireless base station 1a determines the base station to receive UL data as the local station (connected wireless base station 1a). In contrast, when the receiving quality does not satisfy a predetermined criterion, the connected wireless base station 1a determines the base station to receive UL data as any of the other wireless base stations 1b, 1c other than the local station (at this time point, the other wireless base stations 1b, 1c do not have to be determined into one). This is because, when the UL receiving quality from the wireless terminal 2a in the connected wireless base station 1a is poor, it is possible to secure communication efficiency of the entire system more by causing the UL data from the wireless terminal 2a to be received by the other wireless base stations 1b, 1c.

Although the connected wireless base station 1a in this example carries out determination of whether or not to receive at a local station in S103 based on the UL receiving quality, instead of or in addition to this, the determination may also be carried out based on another index. For example, when the UL wireless resource use amount or activity rate of the local station is not less than the predetermination (when there are less space in the UL wireless resource), it is possible that the connected wireless base station 1a determines the base station to receive UL data as other than the local station.

Back to the description of FIG. 3, in this example, it is assumed that the connected wireless base station 1a determines, in S103, the base station to receive UL data as other than the local station (connected wireless base station 1a). At this time, in S104, the connected wireless base station 1a sends wireless resource requesting information, which is information to request a UL wireless resource to the other wireless base stations 1b, 1c via the transmission network. Here, the connected wireless base station 1a is capable of carrying out selection of a sending destination of the wireless resource requesting information based on, for example, DL receiving quality of each wireless base station stored in a measurement report, not illustrated, that is successively received from the wireless terminal 2a. The other wireless base stations 1b, 1c to be the sending destination of wireless resource requesting information may be one or a plurality, and in the example of FIG. 3, it is assumed that two other wireless base stations 1b, 1c are selected as the sending destination.

In S105 in FIG. 3, as receiving the wireless resource requesting information respectively, the other wireless base stations 1b, 1c obtain unused wireless resources. Here, for example, an unused wireless resource in the other wireless base station 1b is a UL wireless resource that the other wireless base station 1b does not cause any subordinate wireless terminal 2b to use for UL sending (not to be scheduled for UL sending). In other words, even when the wireless terminal 2a subordinate to the connected wireless base station 1a carries out UL sending using an unused wireless resource to the other wireless base station 1b, resource conflict turns out not to occur. Since the other wireless base station 1b controls and manages schedules of all subordinate wireless terminals 2b, it is possible to obtain the unused wireless resources easily. In S106, the other wireless base stations 1b, 1c respectively send other station wireless resource information including unused wireless resources information that indicates the obtained unused wireless resources to the connected wireless base station 1a via the transmission network.

The connected wireless base station 1a receives the other station wireless resource information including the unused wireless resources information respectively from the other wireless base stations 1b, 1c. Then, in S107, the connected wireless base station 1a determines a UL wireless resource (referred to as a determined wireless resource) that is used for UL sending from the subordinate wireless terminal 2a and the other wireless base station (referred to as a determined wireless base station) to be a sending destination of the UL sending based on the received unused wireless resources information. Here, it is assumed that the magnitude of the determined wireless resources is not less than the UL wireless resource amount requested in the UL schedule requesting information from the wireless terminal 2a. In S107, the connected wireless base station 1a is capable of determining the determined wireless resource and the determined wireless base station by an arbitrary criterion based on the unused wireless resources indicated by the unused wireless resources information. For example, it is possible that the connected wireless base station 1a selects arbitrary one from the unused wireless resources capable of securing the requested UL wireless resource amount to determine the determined wireless resource therefrom. Then, the connected wireless base station 1a is capable of setting the other wireless base station 1b that has sent the selected unused wireless resource (information) as the determined wireless base station. Here, it is assumed that the connected wireless base station 1a determines the determined wireless resource from the unused wireless resources that the other wireless base station 1b has sent and determines the other wireless base station 1b as the determined wireless base station.

In S108, the connected wireless base station 1a sends information indicating the determined wireless resource determined in S107 (referred to as determined wireless resource information) to the subordinate wireless terminal 2a on a DL wireless signal. Here, this DL wireless signal includes DCI (data control information), which is a DL control signal defined by LTE. DCI is a DL control signal including control information, such as information related to data scheduling, used by the wireless terminal 2a for sending and receiving of data. There are several formats in DCI, and a control object is different depending on the format. For example, format 0 in DCI is to control over the PUSCH, that is, UL data. Formats 1A, 1B, 1C, 1, 2 are respectively to control over the PDSCH, that is, DL data.

FIG. 4 illustrates one example of a DCI format in the first embodiment. The DCI illustrated in FIG. 4 is defined by LTE, and it is used as is in the first embodiment. The DCI in FIG. 4 includes an RNTI (radio network temporary identifier), which is an identifier of a DCI destination (wireless terminal 2a), RB assignment (resource block assignment), which is information indicating the wireless resource having data allocated thereto (to which resource block (RB) on the wireless frame data is assigned), and MCS (modulation and coding scheme), which indicates modulation and coding scheme of data. Although DCI includes, as well as these, parameters, such as an RV (redundancy version), an NDI (new data indicator), a HARQ (hybrid automatic repeat request) processing number, and PUCCH power control, details are omitted.

In the present embodiment, the determined wireless resource information corresponds to the RB assignment of DCI. That is, in S108, the connected wireless base station 1a in the present embodiment sends the determined wireless resource information to the subordinate wireless terminal 2a by sending the DCI on a DL wireless signal. In contrast, in S108, the wireless terminal 2a receives the DL wireless signal including the DCI that includes the determined wireless resource information (RB assignment). At this time, the wireless terminal 2a recognizes (detects) the DCI towards itself based on the RNTI included in the DCI. In addition, the wireless terminal 2a recognizes (detects) that the DCI targets the UL data based on the DCI format.

In S109 in FIG. 3, the connected wireless base station 1a sends the determined wireless resource information to the other wireless base station 1b, which is the determined wireless base station determined in S107 via the transmission network. The connected wireless base station 1a in the present embodiment sends the determined wireless resource information to the other wireless base station 1b, which is the determined wireless base station, by sending the DCI in S109. Here, S108 and S109 may also be simultaneous or opposite in order. This completes scheduling of UL wireless sending from the subordinate wireless terminal 2a to the other wireless base station 1b by the connected wireless base station 1a. When the connected wireless base station 1a determines the base station to receive UL data as the local station in S103, regular UL wireless resource scheduling may be carried out, so that the description is omitted.

Subsequently, in S110 in FIG. 3, the wireless terminal 2a sends a UL wireless signal including the UL data using the UL wireless resource indicated by the received determined wireless resource information (RB assignment of DCI). At this time, the wireless terminal 2a carries out coding and modulation of the UL data based on an MCS included in the DCI received in S108. In contrast, in S110, the other wireless base station 1b receives the UL wireless signal sent by the wireless terminal 2a using the UL wireless resource indicated by the received determined wireless resource information. At this time, the other wireless base station 1b carries out demodulation and decoding of the UL data based on the MCS included in the DCI received in S109. Lastly, in S111, the other wireless base station 1b sends (transfers) the UL data included in the received UL wireless signal to the connected wireless base station 1a via the transmission network. This completes reception of the UL data in S112.

As described above, in the wireless communication system of the first embodiment, the connected wireless base station 1a receives the other station wireless resource information including the unused wireless resources information, which is information indicating UL wireless resources not used by the other wireless base station 1b, from the other wireless base station 1b. Then, the connected wireless base station 1a schedules the UL wireless resource used for UL sending from the subordinate wireless terminal 2a to the other wireless base station 1b based on the received unused wireless resources information. Thus, it is possible to avoid conflict in the UL wireless resource between the UL sending from the wireless terminal 2a subordinate to the connected wireless base station 1a to the other wireless base station 1b and the UL sending from another wireless terminal 2a subordinate to the other wireless base station 1b to the other wireless base station 1b. Accordingly, according to the wireless communication system in the first embodiment, when the wireless terminal 2a carries out communication with different wireless base stations for UL and DL, it is possible that the other wireless base station different from the connected base station receives data from the wireless terminal. In addition, as a result, it is possible to achieve efficient utilization of wireless resources.

Figure 5:
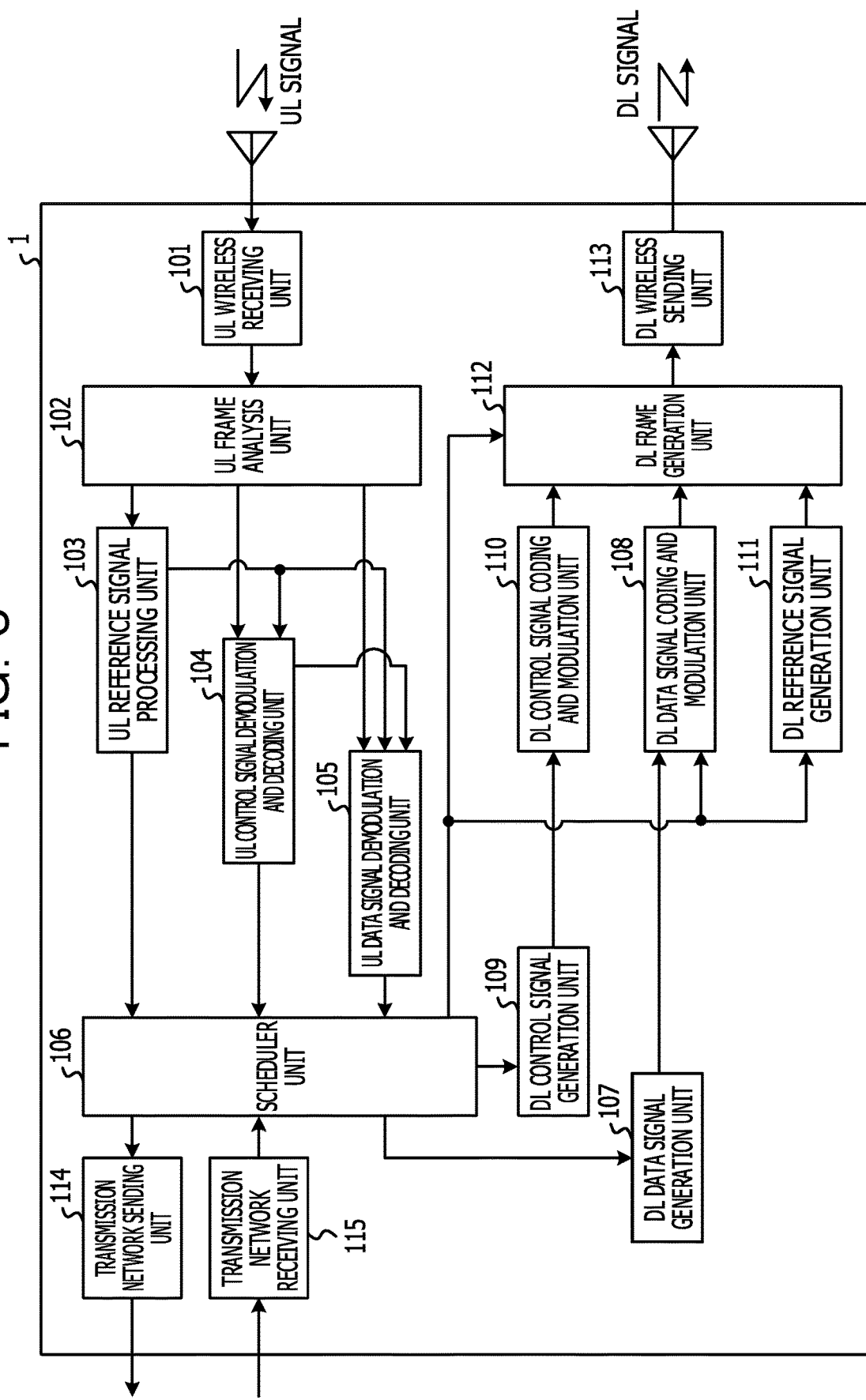
FIG. 5 is one example of a functional configuration diagram of a wireless base station in the wireless communication system of the first embodiment.
Figure 6:
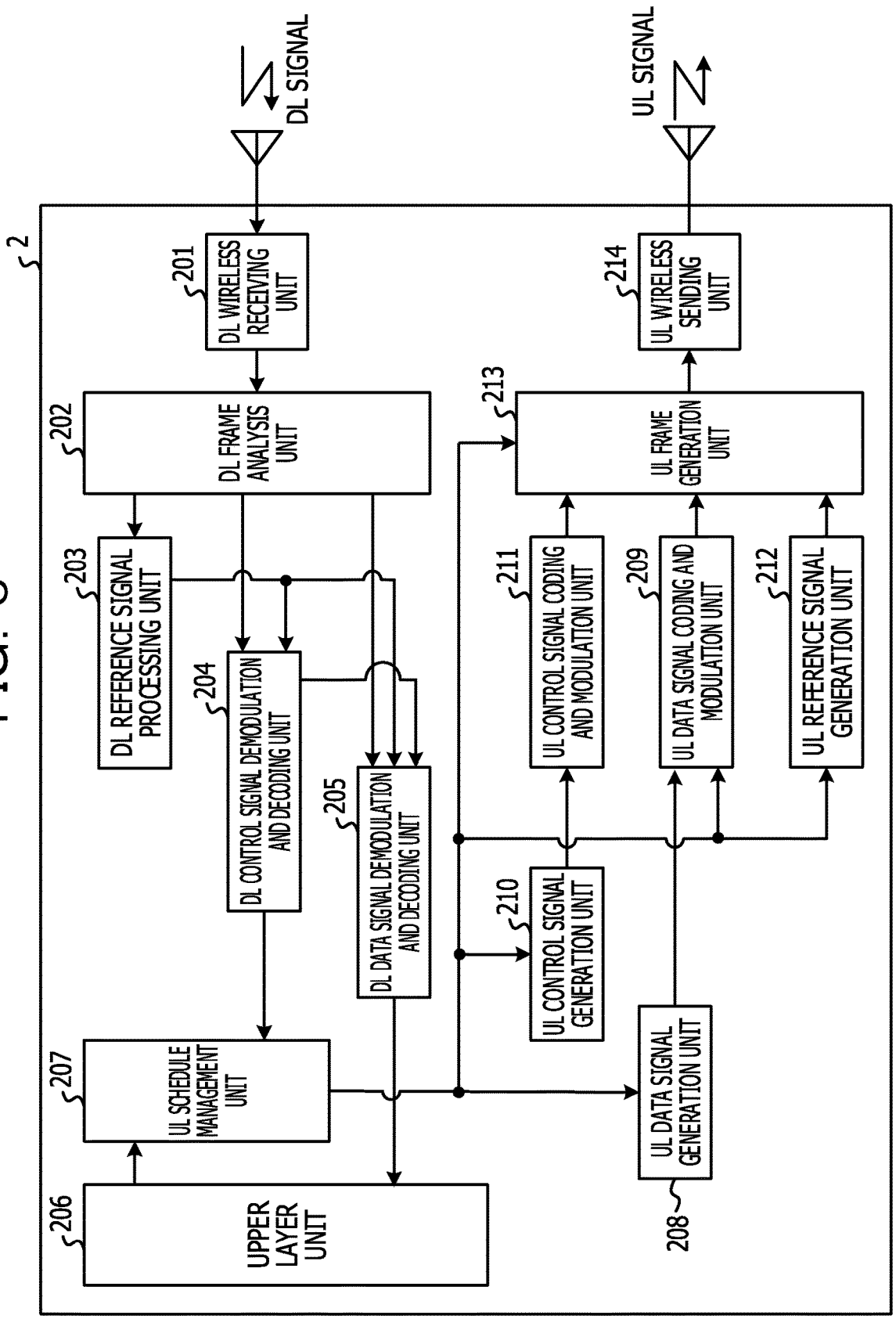
FIG. 6 is one example of a functional configuration diagram of a wireless terminal in the wireless communication system of the first embodiment.

Next, based on FIG. 5 and FIG. 6, descriptions are given to functional configuration of each device in the first embodiment in order.

FIG. 5 is a diagram illustrating one example of functional configuration of the wireless base station 1 in the first embodiment. The wireless base station 1 is provided with, for example, a UL wireless receiving unit 101, a UL frame analysis unit 102, a UL reference signal processing unit 103, a UL control signal demodulation and decoding unit 104, a UL data signal demodulation and decoding unit 105, a scheduler unit 106, a DL data signal generation unit 107, a DL data signal coding and modulation unit 108, a DL control signal generation unit 109, a DL control signal coding and modulation unit 110, a DL reference signal generation unit 111, a DL frame generation unit 112, a DL wireless sending unit 113, a transmission network sending unit 114, and a transmission network receiving unit 115.

Firstly, descriptions are given to each of these functions in the connected wireless base station 1a of the first embodiment.

The UL wireless receiving unit 101 receives a UL wireless signal, downconverts the received wireless signal by frequency conversion and the like for conversion to a baseband signal corresponding to a UL frame, and outputs it to the UL frame analysis unit 102. The UL frame analysis unit 102 extracts a UL data signal, a UL control signal, and a UL reference signal from the baseband signal corresponding to the UL frame. At this time, the UL frame analysis unit 102 carries out extraction of each signal based on UL scheduling information (information equivalent to RB assignment of DCI) inputted from the scheduler unit 106. Then, the UL frame analysis unit 102 outputs the UL reference signal to the UL reference signal processing unit 103, outputs the UL control signal to the UL control signal demodulation and decoding unit 104, and outputs the UL data signal to the UL data signal demodulation and decoding unit 105.

The UL reference signal processing unit 103 obtains UL channel characteristics based on a demodulation reference signal (DM-RS) among the UL reference signal and inputs them to the UL control signal demodulation and decoding unit 104 and the UL data signal demodulation and decoding unit 105. In addition, the UL reference signal processing unit 103 obtains UL receiving quality based on a sounding reference signal (SRS), which is a reference signal for scheduling, among the UL reference signal and inputs it to the scheduler unit 106.

The UL control signal demodulation and decoding unit 104 demodulates the UL control signal to carry out error correction and decoding. The UL control signal demodulation and decoding unit 104 carries out demodulation and decoding of the UL control signal using the UL channel characteristics inputted from a UL reference signal generation unit 212 and predetermined modulation scheme and error correction and coding scheme. The UL control signal demodulation and decoding unit 104 inputs the demodulated and decoded UL control signal to the scheduler unit 106. As examples of the UL control signal, there are UL schedule requesting information, a UL response signal (ACK/NACK signal) to DL data, and the like.

The UL data signal demodulation and decoding unit 105 demodulates the UL data signal to carry out error correction and decoding. The UL data signal demodulation and decoding unit 105 carries out demodulation and decoding of the UL data signal using the UL channel characteristics inputted from the UL reference signal generation unit 212 and the modulation scheme and the error correction and coding scheme inputted from the scheduler unit 106. The UL data signal demodulation and decoding unit 105 inputs the demodulated and decoded UL data signal to the scheduler unit 106.

Descriptions are given to the scheduler unit 106 in the present embodiment. The scheduler unit 106 carries out scheduling of a wireless resource used for wireless communication and also carries out a variety of control associated with the scheduling of a wireless resource. The scheduler unit 106 schedules respective UL and DL wireless resources. As a first example, when UL schedule requesting information, which is one item of the UL control information sent by the wireless terminal 2a, is inputted from the UL control signal demodulation and decoding unit 104, the scheduler unit 106 schedules a UL wireless resource to the wireless terminal 2a. As a second example, in such a case that a DL schedule requisition is inputted from an upper layer unit 206 (a case that data has to be sent to the wireless terminal 2a on a DL), the scheduler unit 106 schedules a DL wireless resource.

Here, when scheduling a UL wireless resource to the wireless terminal 2a, the scheduler unit 106 in the present embodiment selectively determines the wireless base station 1 to be a UL sending destination. In other words, the scheduler unit 106 in the present embodiment is capable of selecting the other wireless base stations 1b, 1c other than the local station (wireless base station 1a) as the UL sending destination. Of course, it goes without saying that the scheduler unit 106 may also select the local station (wireless base station 1a) as the UL sending destination. The scheduler unit 106 may employ a variety of methods in determination of the wireless base station 1 to be the UL sending destination of the wireless terminal 2a and determination of the UL wireless resource to be assigned to the wireless terminal 2a. The scheduler unit 106 may also carry out these determinations collectively and may also carry out them in order.

Descriptions are given to scheduling of a UL wireless resource when the scheduler unit 106 in the present embodiment selects the other wireless base station 1b as the UL sending destination from the wireless terminal 2a. In this case, the scheduler unit 106 has to avoid the conflict in a UL wireless resource described above. With that, when selecting the other wireless base station 1*b* as the UL sending destination, the scheduler unit 106 obtains information related to the UL wireless resource used by the wireless terminal 2*a* subordinate to the other wireless base station 1*b* (hereinafter, may also be referred to as other station wireless resource information). This point is one of the processes that conventional techniques do not perform, so that detailed descriptions are given below.

Descriptions are given to contents of the other station wireless resource information in the present embodiment. The contents of the other station wireless resource information may be, as an example, information indicating a UL wireless resource not used by the other wireless base station 1*b* (referred to as unused wireless resources information). The unused wireless resources information is, so to speak, information indicating a wireless resource where resource conflict does not occur even when being used by the wireless base station 1*a* (even when being scheduled as the UL wireless resource used in UL sending from the wireless terminal 2*a* subordinate to the wireless base station 1*a* to the other wireless base station 1*b*). It becomes possible to avoid UL resource conflict by that the scheduler unit 106 of the connected wireless base station 1*a* selectively determines the UL wireless resource to be assigned to the subordinate wireless terminal 2*a* from the unused wireless resources information received from the other wireless base station 1*b*.

The unused wireless resources information is merely one example of the other station wireless resource information. As another example of the other station wireless resource information, information indicating a UL wireless resource used by the other wireless base station 1*b* (referred to as used wireless resource information) is also available. The used wireless resource information is, so to speak, information indicating a wireless resource where resource conflict occurs when being used by the wireless base station 1*a* (when being scheduled as the UL wireless resource used in the UL sending from the wireless terminal 2*a* subordinate to the wireless base station to the other wireless base station 1*b*). It becomes possible to avoid UL resource conflict by that the scheduler unit 106 of the wireless base station 1*a* selectively determines the UL wireless resource to be assigned to the subordinate wireless terminal 2*a* from the UL wireless resource other than the used wireless resource information received from the other wireless base station 1*b*.

Descriptions are given to a procedure where the connected wireless base station 1*a* of the present embodiment obtains the other station wireless resource information from the other wireless base stations 1*b*, 1*c*. In the procedure where the wireless base station obtains the other station wireless resource information, the scheduler unit 106 carries out, for example, sending of requesting information (referred to as wireless resource requesting information) that requests other station wireless resource information to the other wireless base stations 1*b*, 1*c*. Specifically, it goes as follows, for example. Firstly, when the UL receiving quality inputted from the UL reference signal unit is lower than a predetermined value, the scheduler unit 106 determines to send wireless resource requesting information. Next, the scheduler unit 106 sends wireless resource requesting information to the other wireless base stations 1*b*, 1*c* (adjacent wireless base or peripheral wireless base station). The other wireless base stations 1*b*, 1*c* to be the sending destination may be one or may also be a plurality. In addition, it is possible to carry out the selection of the other wireless base stations 1*b*, 1*c* to be the sending destination based on, for example, DL receiving quality information for each wireless base station that is stored in a measurement report received from the wireless terminal 2*a*. As receiving the wireless resource requesting information, the other wireless base stations 1*b*, 1*c* send other station information including the other station wireless resource information to the connected wireless base station 1*a* in response to the wireless resource requesting information. Thus, the scheduler unit 106 of the wireless base station 1*a* is capable of obtaining the other station wireless resource information from the other wireless base stations 1*b*, 1*c*. There are other examples considered as the procedure where the connected wireless base station 1*a* obtains other station wireless resource information from the other wireless base stations 1*b*, 1*c*, and they are described later (described in a fourth embodiment through a sixth embodiment).

As receiving the other station wireless resource information from the other wireless base stations 1*b*, 1*c* as described above, the scheduler unit 106 carries out UL scheduling to the subordinate wireless terminal 2*a* based on the other station wireless resource information. Specifically, the scheduler unit 106 determines the determined wireless resource, which is the UL wireless resource used for the UL sending from the subordinate wireless terminal 2*a*, and the determined wireless base station, which is the other wireless base station 1*b* to be the sending destination of the UL sending, based on the unused wireless resources information included in the received other station wireless resource information. Here, it is assumed that the magnitude of the determined wireless resources is not less than the UL wireless resource amount requested in the UL schedule requesting information from the wireless terminal 2*a*. The scheduler unit 106 is capable of determining the determined wireless resource and the determined wireless base station by an arbitrary criterion based on the unused wireless resources indicated by the unused wireless resources information. For example, it is possible that the scheduler unit 106 selects arbitrary one from the unused wireless resources capable of securing the requested UL wireless resource amount to determine the determined wireless resource therefrom. Then, the scheduler unit 106 is capable of setting the other wireless base station 1*b* that has sent the selected unused wireless resource (information) as the determined wireless base station.

As described above, the scheduler unit 106 carries out scheduling of the UL wireless resource to the wireless base station 1*b* from the wireless terminal 2*a* when the other wireless base station 1*b* is selected as the UL sending destination from the wireless terminal 2*a*. After that, in order to generate a DCI, the scheduler unit 106 inputs the UL scheduling result to the DL control signal generation unit 109. The UL scheduling result is information including a wireless resource for UL sending (the above determined wireless resource), an identifier of the wireless terminals 2*a*, a coding and modulation scheme of a signal, and the like. In addition, when selecting the other wireless base station 1*b*, the scheduler unit 106 also inputs the UL scheduling result to the transmission network sending unit 114. Further in this case, the scheduler unit 106 inputs base station identification information indicating the UL receiving other wireless base station 1*b* (corresponding to the determined wireless base station) to the transmission network sending unit 114.

In contrast, when selecting the local station as the UL sending destination from the wireless terminal 2*a*, the scheduler unit 106 carries out general UL scheduling (the description is omitted). Then, in order to generate a DCI, the scheduler unit 106 inputs the UL scheduling result to the DL control signal generation unit 109. For the preparation of UL reception at the local station, the scheduler unit 106 inputs the UL scheduling result to the UL frame analysis unit 102.

Meanwhile, when DL data occurs, the scheduler unit 106 schedules DL sending. In this case, the scheduler unit 106 carries out general DL scheduling (the description is omitted). In order to generate a DCI, the scheduler unit 106 inputs the DL scheduling result to the DL control signal generation unit 109. The DL scheduling result is information including a wireless resource for DL sending, an identifier of the wireless terminal 2a, a coding and modulation scheme of a signal, and the like. In addition, the scheduler unit 106 inputs DL data to the DL data signal generation unit 107.

Back to the descriptions in FIG. 5, as the DL data is inputted from the scheduler unit 106, the DL data signal generation unit 107 generates a DL data signal and inputs it to a DL data coding and modulation unit. The DL data coding and modulation unit codes and modulates the DL data signal based on the coding scheme and the modulation scheme inputted from the scheduler unit 106 and inputs it to the DL frame generation unit 112.

A DL control information generation unit generates DL control information based on the scheduling result inputted from the scheduler unit 106 and inputs it to the DL control signal coding and modulation unit 110. As an example, the DL control signal generation unit 109 generates the DCI described before based on the inputted scheduling result. The DL control signal generation unit 109 sets an RB assignment value of the DCI based on the determined wireless resource included in the scheduling result inputted from the scheduler unit 106. In addition, the DL control signal generation unit 109 sets the wireless terminal identifier inputted from the scheduler as an RNTI value and sets the modulation scheme and the coding scheme as an MCS value. The DL control signal generation unit 109 inputs the generated DL control signal to the DL control signal coding and modulation unit 110.

The DL control signal coding and modulation unit 110 codes and modulates the DL control signal based on the predetermined modulation scheme and coding scheme and inputs it to the DL frame generation unit 112. The DL reference signal generation unit 111 generates the DL reference signal and inputs it to the DL frame generation unit 112.

The DL frame generation unit 112 places (also called as maps) the DL data signal, the DL control signal, and the DL reference signal after coding and modulation in a DL frame and generates a DL frame. The DL frame generation unit 112 carries out mapping of each DL signal using the DL scheduling result inputted from the scheduler unit 106. That is, the DL frame generation unit 112 carries out mapping of each signal to the wireless resource (RB) defined in the DL scheduling result inputted from the scheduler unit 106. The DL frame generation unit 112 inputs the baseband signal corresponding to the generated DL frame to the DL wireless sending unit 113.

The DL wireless sending unit 113 upconverts the baseband signal corresponding to the inputted DL frame to a wireless signal by frequency conversion and the like and wirelessly sends the wireless signal to the wireless terminal 2a.

The transmission network sending unit 114 sends a data signal and a control signal to the other wireless base stations 1b, 1c, other control devices, relay devices, and the like via the backhaul network. As an example, when the scheduler unit 106 selects other than the local station as the UL sending destination, the transmission network sending unit 114 sends the wireless resource requesting information described above to the other wireless base stations 1b, 1c. The sending of the wireless resource requesting information is carried out by accepting an input of base station identifiers indicating the other wireless base stations 1b, 1c from the scheduler unit 106. As an example, when the scheduler unit 106 selects the other wireless base station 1b as the UL sending destination, the transmission network sending unit 114 sends the determined wireless resource information described above to the other wireless base station 1b. The sending of the determined wireless resource information is carried out by accepting an input of the UL scheduling result and the base station identifier from the scheduler unit 106.

The transmission network receiving unit 115 receives a data signal and a control signal from the other wireless base stations 1b, 1c, other control devices, relay devices, and the like via the backhaul network. For example, when the scheduler unit 106 selects other than the local station as the UL sending destination, the transmission network receiving unit 115 receives the other station wireless resource information described before from the other wireless base stations 1b, 1c. The transmission network receiving unit 115 inputs the received other station wireless resource information to the scheduler unit 106.

Next, descriptions are given to the other wireless base station 1b in the first embodiment (the other wireless base station 1c is similar).

Although the other wireless base station 1b also has a functional configuration same as FIG. 5, different process is carried out in a part of the functions. It goes without saying that the respective wireless base stations 1 may be provided with both a function provided in the connected wireless base station 1a and a function provided in the other wireless base station 1b. In other words, the respective wireless base stations are capable of behaving as the connected wireless base station to a certain wireless terminal and behaving as another wireless base station to another wireless terminal.

The transmission network receiving unit 115 of the other wireless base station 1b receives a data signal and a control signal from the connected wireless base station 1a, other control devices, relay devices, and the like connected to the backhaul network. As an example, when the connected wireless base station 1a selects other than the local station (connected wireless base station 1a) as the UL sending destination from the subordinate wireless terminal 2a, the transmission network receiving unit 115 receives the wireless resource requesting information described before from the connected wireless base station 1a. The transmission network receiving unit 115 inputs the received wireless resource requesting information to the scheduler unit 106. As another example, the transmission network receiving unit 115 receives the determined wireless resource information described before from the connected wireless base station 1a. The transmission network receiving unit 115 inputs the received determined wireless resource assignment information to the scheduler unit 106.

The scheduler unit 106 of the other wireless base station 1b generates other station wireless resource information based on the inputted wireless resource requesting information. In the present embodiment, as described before, the other station wireless resource information includes the unused wireless resources information, which is information indicating UL resources not used by the other wireless base station 1b. The scheduler unit 106 generates the unused wireless resources information as follows.

The scheduler unit 106 of the other wireless base station 1b subjectively and also fully determines scheduling of each wireless terminal 2b subordinate to the other wireless base station 1b. Therefore, the scheduler unit 106 recognizes fixed scheduling (wireless resource to be used) in the present and future of each subordinate wireless terminal 2b. In addition, the scheduler unit 106 is also capable of controlling not to use a certain wireless resource in the future (not to use a certain frequency range in a certain period). Accordingly, the scheduler unit 106 of the other wireless base station 1b is capable of recognizing a wireless resource not used by the local station (other wireless base station 1b), in other words, a wireless resource not to be scheduled for the subordinate wireless terminal 2b by the local station. With that, the scheduler unit 106 of the other wireless base station 1b selects a part or all of the wireless resources not used by the local station to set information indicating the selected wireless resource as the unused wireless resources information. Then, the scheduler unit 106 generates other station wireless resource information including the unused wireless resources information. The scheduler unit 106 inputs the generated other station wireless resource information to the transmission network sending unit 114.

In addition, the scheduler unit 106 of the other wireless base station 1b carries out scheduling to accept the UL sending from the wireless terminal 2a subordinate to the connected wireless base station 1a based on the determined wireless resource information received from the connected wireless base station 1a. The determined wireless resource information is determined by the connected wireless base station 1a based on the unused wireless resources information sent earlier, and is information indicating a part or all of the UL wireless resource indicated by the unused wireless resources information. The scheduler unit 106 inputs the UL scheduling result that reflects the received UL resource assignment information to the UL frame analysis unit 102. The UL frame analysis unit 102 extracts respective information from the UL frame based on the UL scheduling result. Thus, it becomes possible that the other wireless base station 1b receives data on a UL from the wireless terminal 2a subordinate to the connected wireless base station 1a.

When the connected wireless base station 1a selects the other wireless base station 1b as the UL sending destination, the transmission network sending unit 114 of the other wireless base station 1b in the present embodiment sends the other station wireless resource information including the unused wireless resources information to the connected wireless base station 1a. The sending is carried out by accepting an input of the other station wireless resource information from the scheduler unit 106.

Next, descriptions are given to the wireless terminal 2a in the first embodiment.

FIG. 6 is a diagram illustrating one example of a functional configuration of the wireless terminals 2a in the first embodiment. The wireless terminal 2a is provided with, for example, a DL wireless receiving unit 201, a DL frame analysis unit 202, a DL reference signal processing unit 203, a DL control signal demodulation and decoding unit 204, a DL data signal demodulation and decoding unit 205, an upper layer unit 206, a UL schedule management unit 207, a UL data signal generation unit 208, a UL data signal coding and modulation unit 209, a UL control signal generation unit 210, a UL control signal coding and modulation unit 211, a UL reference signal generation unit 212, a UL frame generation unit 213, and a UL wireless sending unit 214.

The DL wireless receiving unit 201 receives a DL wireless signal, downconverts the received wireless signal by frequency conversion and the like to convert it to a baseband signal corresponding to the DL frame, and outputs it to the DL frame analysis unit 202. The DL frame analysis unit 202 extracts a DL data signal, a DL control signal, and a DL reference signal from the baseband signal corresponding to the DL frame. Then, the DL frame analysis unit 202 outputs the DL reference signal to the DL reference signal processing unit 203, outputs the DL control signal to the DL control signal demodulation and decoding unit 204, and outputs the DL data signal to the DL data signal demodulation and decoding unit 205.

The DL reference signal processing unit 203 of the wireless terminal 2a estimates DL channel characteristics based on the DL reference signal and outputs the DL channel characteristics respectively to the DL control signal demodulation and decoding unit 204 and the DL data signal demodulation and decoding unit 205.

The DL control signal demodulation and decoding unit 204 demodulates the DL control signal and extracts DL control information by carrying out error correction and decoding. The DL control signal demodulation and decoding unit 204 carries out demodulation and decoding of the DL control signal using the DL channel characteristics and predetermined demodulation scheme and error correction and decoding scheme. As obtaining the DCI, which is the DL control information, by demodulation and decoding, the DL control signal demodulation and decoding unit 204 recognizes (detects) a DCI towards itself based on the RNTI included therein. The DL control signal demodulation and decoding unit 204 recognizes (detects) whether the scope of DCI application is UL data (PUSCH) or DL data (PDSCH) based on the DCI format. Regarding the DCI towards itself that targets the DL data, the DL control signal demodulation and decoding unit 204 inputs the RB assignment and the MCS included in the DCI to the DL data signal demodulation and decoding unit 205. Regarding the DCI towards itself that targets the UL data, the DL control signal demodulation and decoding unit 204 inputs the RB assignment and the MCS included in the DCI to the UL schedule management unit 207.

The DL data signal demodulation and decoding unit 205 demodulates the DL data signal and extracts DL data information by carrying out error correction and decoding. In the DL data signal, one or more items of data information to the wireless terminal 2a are multiplexed. The DL data signal demodulation and decoding unit 205 carries out extraction of a DL data signal towards itself using the RB assignment inputted from the DL control signal demodulation and decoding unit 204. After that, the DL data signal demodulation and decoding unit 205 carries out demodulation and decoding of the DL data signal based on the DL channel characteristics and the MCS inputted from the DL control signal demodulation and decoding unit 204. The DL data signal demodulation and decoding unit 205 inputs the obtained DL data to the upper layer unit 206.

The upper layer unit 206 processes the inputted DL data to provide various functions in the wireless terminal 2a. Although there are, for example, a voice call, a web browser, a mailer, and the like as the functions provided by the upper layer unit 206, there may also be other arbitrary functions. The upper layer unit 206 generates UL data (information) based on the functions to be provided and inputs them to the UL schedule management unit 207.

The UL schedule management unit 207 carries out management of the UL schedule when UL data occurs. This is carried out as follows. As UL data is inputted from the upper layer unit 206, the UL schedule management unit 207 inputs an instruction signal that is to send UL wireless resource requesting information, which is one of the UL control signal, to the connected wireless base station 1a to the UL control signal generation unit 210 for the purpose of securing the UL wireless resource in a resource amount to be used for the UL data. With respect to the UL wireless resource requesting information, the connected wireless base station 1a notifies the wireless terminal 2a of the UL wireless resource by the DCI, which is a DL control signal. After that, as described before, regarding the DCI towards itself that targets the UL data, the DL control signal demodulation and decoding unit 204 inputs the RB assignment and the MCS included in the DCI to the UL schedule management unit 207. As they are inputted, the UL schedule management unit 207 inputs the UL data inputted earlier to the UL data signal generation unit 208 for the purpose of carrying out UL data sending. Further, the UL schedule management unit 207 inputs the inputted MCS to the data signal coding and modulation unit and also inputs the RB assignment to the UL frame generation unit 213.

The UL data signal generation unit 208 generates a UL data signal based on the inputted UL data information and inputs it to the UL data signal coding and modulation unit 209. The UL data signal coding and modulation unit 209 makes error correction and coding and modulation of the inputted UL data signal based on the MCS inputted from the UL schedule management unit 207 and inputs it to the UL frame generation unit 213.

The UL control information generation unit generates UL control information based on the instruction signal inputted from the UL schedule management unit 207 and the like and inputs it to the UL control signal coding and modulation unit 211. As examples of the UL control signal, there are UL schedule requesting information to request a UL wireless resource to the connected wireless base station 1a when UL data occurs, a response signal (ACK/NACK signal) to DL data, and the like. The UL control signal coding and modulation unit 211 makes error correction and coding and modulation of the UL control signal inputted from the UL control signal generation unit 210 based on a predetermined modulation scheme and a coding scheme and inputs it to the UL frame generation unit 213.

The UL reference information generation unit generates UL reference information based on the instruction from the UL schedule management unit 207 and inputs it to the UL frame generation unit 213. UL reference signals include, as described before, a DM-RS (demodulation reference signal) and a SRS (surrounding reference signal).

The UL frame generation unit 213 places (maps) the UL data signal, the UL control signal, and the UL reference signal in a UL frame and generates a UL frame. The UL frame generation unit 213 carries out mapping of each signal using the RB assignment inputted from the UL schedule management unit 207. The UL frame generation unit 213 inputs a baseband signal corresponding to the generated UL frame to a wireless sending unit. The wireless sending unit upconverts the baseband signal corresponding to the inputted UL frame by frequency conversion and the like to a wireless signal for wireless sending of the wireless signal to the wireless base station 1.

Figure 7:
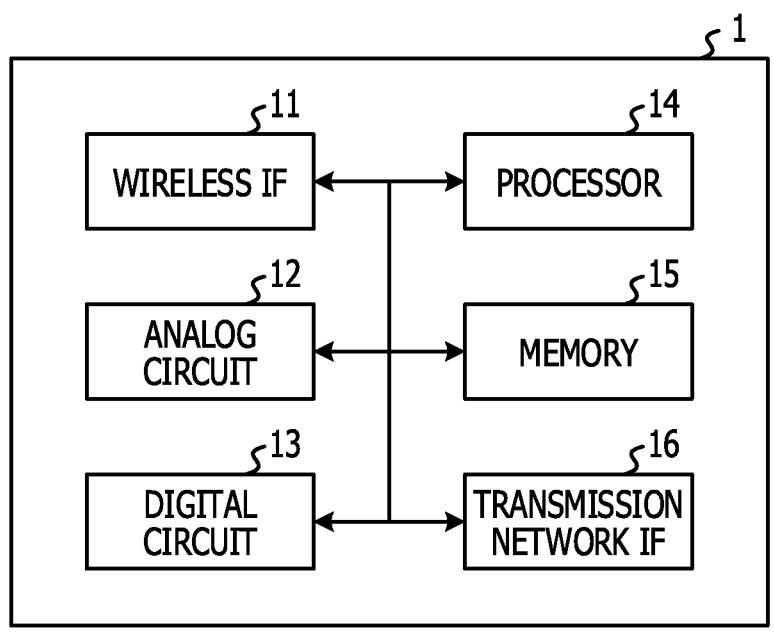
FIG. 7 is one example of a hardware configuration diagram of the wireless base station in the wireless communication system of the first embodiment.
Figure 8:
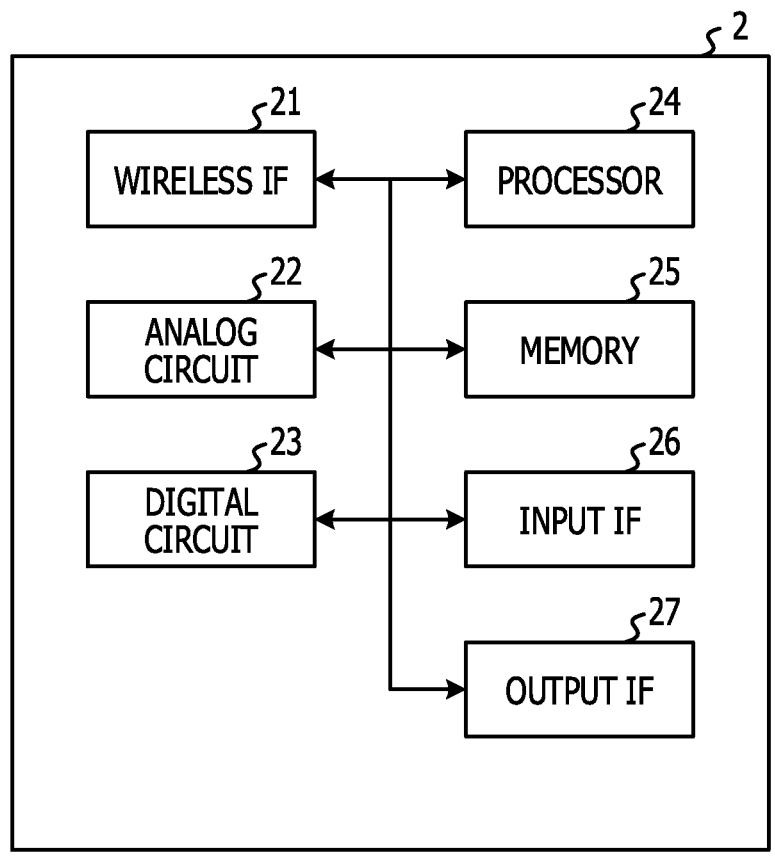
FIG. 8 is one example of a hardware configuration diagram of the wireless terminal in the wireless communication system of the first embodiment.

Next, based on FIGS. 7 and 8, descriptions are given to a hardware configuration of each device in the wireless communication system of the first embodiment.

FIG. 7 illustrates one example of a hardware configuration of the wireless base station 1 in the present embodiment. Each function of the wireless base stations 1 described before are achieved by a part or all of the hardware components below. The wireless base station 1 in an embodiment is provided with a wireless IF (interface) 11, an analog circuit 12, a digital circuit 13, a processor 14, a memory 15, a transmission network IF 16, and the like.

The wireless IF 11 is an interface device to carry out wireless communication with the wireless terminals 2 and is, for example, an antenna. The analog circuit 12 is a circuit to process an analog signal and may be roughly categorized into those carrying out receiving process, those carrying out sending process, and those carrying out other process. The analog circuit that carries out receiving process includes, for example, a low noise amplifier (LNA), a band pass filter (BPF), a mixer, a low pass filter (LPF), an automatic gain control amplifier (AGC: automatic gain controller), an analog-to-digital converter (ADC), a phase locked loop (PLL), and the like. The analog circuit that carries out sending process includes, for example, a power amplifier (PA), a BPF, a mixer, an LPF, a digital-to-analog converter (DAC), a PLL, and the like. The analog circuit that carries out other process includes a duplexer and the like. The digital circuit 13 is a circuit to process a digital signal and includes, for example, an LSI (large scale integration), an FPGA (field-programming gate array), an ASIC (application specific integrated circuit), and the like. The processor 14 is a device to process data and includes, for example, a CPU (central processing unit), a DSP (digital signal processor), and the like. The memory 15 is a device to memorize data and includes, for example, a ROM (read only memory), a RAM (random access memory), and the like. The transmission network IF 16 is an interface device to be connected to the backhaul network of the wireless communication system by a wired link or a wireless link and to carry out wired communication or wireless communication with a device on a transmission network side including another wireless base station 1 connected to the backhaul network or the core network.

Descriptions are given to correspondence relationship of the functional configuration and the hardware configuration of the wireless base station 1.

The UL wireless receiving unit 101 is achieved by, for example, the wireless IF 11 and the analog circuit 12 (those carrying out receiving process). That is, the wireless IF 11 receives a UL wireless signal from the wireless terminal 2a, and the analog circuit 12 downconverts the received wireless signal by frequency conversion and the like to convert it to a baseband signal corresponding to a UL frame. The UL frame analysis unit 102 is achieved by, for example, the processor 14, the memory 15, and the digital circuit 13. That is, the processor 14 controls the memory 15 as occasion calls, cooperates with the digital circuit 13 as occasion calls, and extracts a UL data signal, a UL control signal, and a UL reference signal from the baseband signal corresponding to the UL frame. In addition, the digital circuit 13 may also extract a UL data signal, a UL control signal, and a UL reference signal from the baseband signal corresponding to the UL frame.

The UL reference signal processing unit 103 is achieved by, for example, the processor 14, the memory 15, and the digital circuit 13. That is, the processor 14 controls the memory 15 as occasion calls, cooperates with the digital circuit 13 as occasion calls, obtains the UL channel characteristics based on the DM-RS, and obtains the UL receiving quality based on the SRS. In addition, the digital circuit 13 may also obtain the UL channel characteristics based on the DM-RS and obtain the UL receiving quality based on the SRS.

The UL control signal demodulation and decoding unit 104 is achieved by, for example, the processor 14, the memory 15, and the digital circuit 13. That is, the processor 14 controls the memory 15 as occasion calls, cooperates with the digital circuit 13 as occasion calls, demodulates a UL control signal, and carries out error correction and decoding. In addition, the digital circuit 13 may also demodulate a UL control signal and carry out error correction and decoding. The UL data signal demodulation and decoding unit 105 is achieved by, for example, the processor 14, the memory 15, and the digital circuit 13. That is, the processor 14 controls the memory 15 as occasion calls, cooperates with the digital circuit 13 as occasion calls, demodulates a UL data signal, and carries out error correction and decoding. In addition, the digital circuit 13 may also demodulate a UL data signal and carry out error correction and decoding.

The scheduler unit 106 is achieved by, for example, the processor 14, the memory 15, and the digital circuit 13. That is, the processor 14 controls the memory 15 as occasion calls, cooperates with the digital circuit 13 as occasion calls, and carries out scheduling of the wireless resource used for wireless communication, and also carries out a variety of control associated with the scheduling of the wireless resource. In addition, the digital circuit 13 may also carry out scheduling of the wireless resource used for wireless communication and also carry out a variety of control associated with the scheduling of the wireless resource.

The DL data signal generation unit 107 is achieved by, for example, the processor 14, the memory 15, and the digital circuit 13. That is, the processor 14 controls the memory 15 as occasion calls, cooperates with the digital circuit 13 as occasion calls, and generates a DL data signal. In addition, the digital circuit 13 may also generate a DL data signal. The DL data coding and modulation unit is achieved by, for example, the processor 14, the memory 15, and the digital circuit 13. That is, the processor 14 controls the memory 15 as occasion calls, cooperates with the digital circuit 13 as occasion calls, and codes and modulates a DL data signal. In addition, the digital circuit 13 may also code and modulate a DL data signal. The DL control information generation unit is achieved by, for example, the processor 14, the memory 15, and the digital circuit 13. That is, the processor 14 controls the memory 15 as occasion calls, cooperates with the digital circuit 13 as occasion calls, and generates DL control information. In addition, the digital circuit 13 may also generate DL control information. The DL data coding and modulation unit is achieved by, for example, the processor 14, the memory 15, and the digital circuit 13. That is, the processor 14 controls the memory 15 as occasion calls, cooperates with the digital circuit 13 as occasion calls, and codes and modulates a DL control signal. In addition, the digital circuit 13 may also code and modulate a DL control signal. The DL reference signal generation unit 111 is achieved by, for example, the processor 14, the memory 15, and the digital circuit 13. That is, the processor 14 controls the memory 15 as occasion calls, cooperates with the digital circuit 13 as occasion calls, and generates a DL reference signal. In addition, the digital circuit 13 may also generate a DL reference signal. The DL frame generation unit 112 is achieved by, for example, the processor 14, the memory 15, and the digital circuit 13. That is, the processor 14 controls the memory 15 as occasion calls, cooperates with the digital circuit 13 as occasion calls, places the DL data signal, the DL control signal, and the DL reference signal after coding and modulation in a DL frame, and generates a DL frame. In addition, the digital circuit 13 may also place the DL data signal, the DL control signal, and the DL reference signal after coding and modulation in a DL frame and generate a DL frame.

The DL wireless sending unit 113 is achieved by, for example, the wireless IF 11 and the analog circuit 12 (those carrying out sending process). That is, the analog circuit 12 upconverts a baseband signal corresponding to the inputted DL frame by frequency conversion and the like to a wireless signal, and the wireless IF 11 wirelessly sends the wireless signal to the wireless terminals 2. While the DL wireless sending unit 113 and the UL wireless receiving unit 101 may be achieved by different wireless IFs 11 (antennas), they may also share one wireless IF 11 by using a duplexer, which is the analog circuit 12.

The transmission network sending unit 114 is achieved by, for example, the transmission network IF 16, the analog circuit 12, the processor 14, the memory 15, and the digital circuit 13. That is, the processor 14 controls the memory 15 as occasion calls, cooperates with the digital circuit 13 as occasion calls, and converts a data signal and a control signal to be sent to a digital baseband signal. In addition, the analog circuit 12 converts the digital baseband signal to a wired signal or a wireless signal, and the transmission network IF 16 sends the wired signal or the wireless signal. The transmission network receiving unit 115 is achieved by, for example, the transmission network IF 16, the analog circuit 12, the processor 14, the memory 15, and the digital circuit 13. That is, the transmission network IF 16 receives the wired signal or the wireless signal, and the analog circuit 12 converts the wired signal or the wireless signal to a digital baseband signal. In addition, the processor 14 controls the memory 15 as occasion calls, cooperates with the digital circuit 13 as occasion calls, and converts a digital baseband signal to a data signal and a control signal.

FIG. 8 illustrates one example of a hardware configuration of the wireless terminal 2 in the first embodiment. Each function of the wireless terminals 2 described before is achieved by a part or all of the hardware components below. The wireless terminal 2 in the above embodiment is provided with a wireless IF 21, an analog circuit 22, a digital circuit 23, a processor 24, a memory 25, an input IF 26, an output IF 27, and the like.

The wireless IF 21 is an interface device to carry out wireless communication with the wireless base stations 1 and is, for example, an antenna. The analog circuit 22 is a circuit to process an analog signal and may be roughly categorized into those carrying out receiving process, those carrying out sending process, and those carrying out other process. The analog circuit that carries out receiving process includes, for example, an LNA, a BPF, a mixer, an LPF, an AGC, an ADC, a PLL, and the like. The analog circuit that carries out sending process includes, for example, a PA, a BPF, a mixer, an LPF, a DAC, a PLL, and the like. The analog circuit that carries out other process includes a duplexer and the like. The digital circuit 23 includes, for example, an LSI, an FPGA, an ASIC, and the like. The processor 24 is a device to process data and includes, for example, a CPU, a DSP, and the like. The memory 25 is a device to memorize data and includes, for example, a ROM, a RAM, and the like. The input IF 26 is a device to carry out an input and includes, for example, an operation button, a microphone, and the like. The output IF 27 is a device to carry out an output and includes, for example, a display, a speaker, and the like.

Descriptions are given to correspondence relationship of the functional configuration and the hardware configuration of the wireless terminal 2.

The DL wireless receiving unit 201 is achieved by, for example, the wireless IF 21 and the analog circuit 22 (those carrying out receiving process). That is, the wireless IF 21 receives a DL wireless signal from the wireless base station 1, and the analog circuit 22 downconverts the received wireless signal by frequency conversion and the like to convert it to a baseband signal corresponding to a DL frame. The DL frame analysis unit 202 is achieved by, for example, the processor 24, the memory 25, and the digital circuit 23. That is, the processor 24 controls the memory 25 as occasion calls, cooperates with the digital circuit 23 as occasion calls, and extracts a DL data signal, a DL control signal, and a DL reference signal from the baseband signal corresponding to the DL frame. In addition, the digital circuit 23 may also extract a DL data signal, a DL control signal, and a DL reference signal from the baseband signal corresponding to the DL frame.

The DL reference signal processing unit 203 is achieved by, for example, the processor 24, the memory 25, and the digital circuit 23. That is, the processor 24 controls the memory 25 as occasion calls, cooperates with the digital circuit 23 as occasion calls, and obtains the DL channel characteristics based on the DL reference signal. In addition, the digital circuit 23 may also obtain the DL channel characteristics based on the DL reference signal.

The DL control signal demodulation and decoding unit 204 is achieved by, for example, the processor 24, the memory 25, and the digital circuit 23. That is, the processor 24 controls the memory 25 as occasion calls, cooperates with the digital circuit 23 as occasion calls, demodulates a DL control signal, and carries out error correction and decoding. In addition, the digital circuit 23 may also demodulate a DL control signal and carry out error correction and decoding. The DL data signal demodulation and decoding unit 205 is achieved by, for example, the processor 24, the memory 25, and the digital circuit 23. That is, the processor 24 controls the memory 25 as occasion calls, cooperates with the digital circuit 23 as occasion calls, demodulates a DL data signal, and carries out error correction and decoding. In addition, the digital circuit 23 may also demodulate a DL data signal and carry out error correction and decoding.

The upper layer unit 206 is achieved by, for example, the processor 24, the memory 25, and the digital circuit 23. That is, the processor 24 controls the memory 25 as occasion calls, cooperates with the digital circuit 23 as occasion calls, processes the inputted DL data, provides various functions in the wireless terminal 2a, and also generates UL data (information) based on the provided functions. In addition, the digital circuit 23 may also process the inputted DL data, provide various functions in the wireless terminal 2a, and also generate UL data (information) based on the provided functions. The UL schedule management unit 207 is achieved by, for example, the processor 24, the memory 25, and the digital circuit 23. That is, the processor 24 controls the memory 25 as occasion calls, cooperates with the digital circuit 23 as occasion calls, and carries out management of a UL schedule when UL data occurs. In addition, the digital circuit 23 may also carry out management of a UL schedule when UL data occurs.

The UL data signal generation unit 208 is achieved by, for example, the processor 24, the memory 25, and the digital circuit 23. That is, the processor 24 controls the memory 25 as occasion calls, cooperates with the digital circuit 23 as occasion calls, and generates a UL data signal. In addition, the digital circuit 23 may also generate a UL data signal. The UL data coding and modulation unit is achieved by, for example, the processor 24, the memory 25, and the digital circuit 23. That is, the processor 24 controls the memory 25 as occasion calls, cooperates with the digital circuit 23 as occasion calls, and codes and modulates a UL data signal. In addition, the digital circuit 23 may also code and modulate a UL data signal. The UL control information generation unit is achieved by, for example, the processor 24, the memory 25, and the digital circuit 23. That is, the processor 24 controls the memory 25 as occasion calls, cooperates with the digital circuit 23 as occasion calls, and generates UL control information. In addition, the digital circuit 23 may also generate UL control information. The UL data coding and modulation unit is achieved by, for example, the processor 24, the memory 25, and the digital circuit 23. That is, the processor 24 controls the memory 25 as occasion calls, cooperates with the digital circuit 23 as occasion calls, and codes and modulates a UL control signal. In addition, the digital circuit 23 may also code and modulate a UL control signal. The UL reference signal generation unit 212 is achieved by, for example, the processor 24, the memory 25, and the digital circuit 23. That is, the processor 24 controls the memory 25 as occasion calls, cooperates with the digital circuit 23 as occasion calls, and generates a UL reference signal. In addition, the digital circuit 23 may also generate a UL reference signal. The UL frame generation unit 213 is achieved by, for example, the processor 24, the memory 25, and the digital circuit 23. That is, the processor 24 controls the memory 25 as occasion calls, cooperates with the digital circuit 23 as occasion calls, places the UL data signal, the UL control signal, and the UL reference signal after coding and modulation in a UL frame, and generates a UL frame. In addition, the digital circuit 23 may also place the UL data signal, the UL control signal, and the UL reference signal after coding and modulation in a UL frame and generate a UL frame.

The UL wireless sending unit 214 is achieved by, for example, the wireless IF 21 and the analog circuit 22 (those carrying out sending process). That is, the analog circuit 22 upconverts a baseband signal corresponding to the inputted UL frame by frequency conversion and the like to a wireless signal, and the wireless IF 21 wirelessly sends the wireless signal to the wireless terminals 2. While the UL wireless sending unit 214 and the DL wireless receiving unit 201 may be achieved by different wireless IFs 21 (antennas), they may also share one wireless IF 21 by using a duplexer, which is the analog circuit 22.

As have been described based on FIGS. 2 through 8, in the wireless communication system in the first embodiment, the connected wireless base station 1a receives other station wireless resource information including unused wireless resources information, which is information indicating a UL wireless resource not used by the other wireless base station 1b from the other wireless base station 1b. Then, the connected wireless base station 1a schedules a UL wireless resource used for UL sending from the subordinate wireless terminal 2a to the other wireless base station 1b based on the received unused wireless resources information. Thus, it is possible to avoid conflict in a UL wireless resource between UL sending from the wireless terminal 2a subordinate to the connected wireless base station 1a to the other wireless base station 1b and UL sending from another wireless terminal 2a subordinate to the other wireless base station 1b to the other wireless base station 1b. Accordingly, according to the wireless communication system in the first embodiment, when the wireless terminal 2a carries out communication with different wireless base stations for UL and DL, it is possible that the other wireless base station 1b different from the connected base station 1a receives data from the wireless terminal 2a. In addition, as a result, it is possible to achieve efficient utilization of a wireless resource.

[c] Second Embodiment

In the second embodiment, descriptions are given to an example other than the first embodiment when the wireless terminal 2a carries out communication with wireless base stations 1 different for DL and UL. In the second embodiment, descriptions are given to a case where sending data (DL data) to the subordinate wireless terminal 2a occurs in the wireless base station 1a.

In the second embodiment, there are many points in common with the first embodiment. In the following descriptions, descriptions are given mainly to the points different from the first embodiment in the second embodiment.

Figure 9:
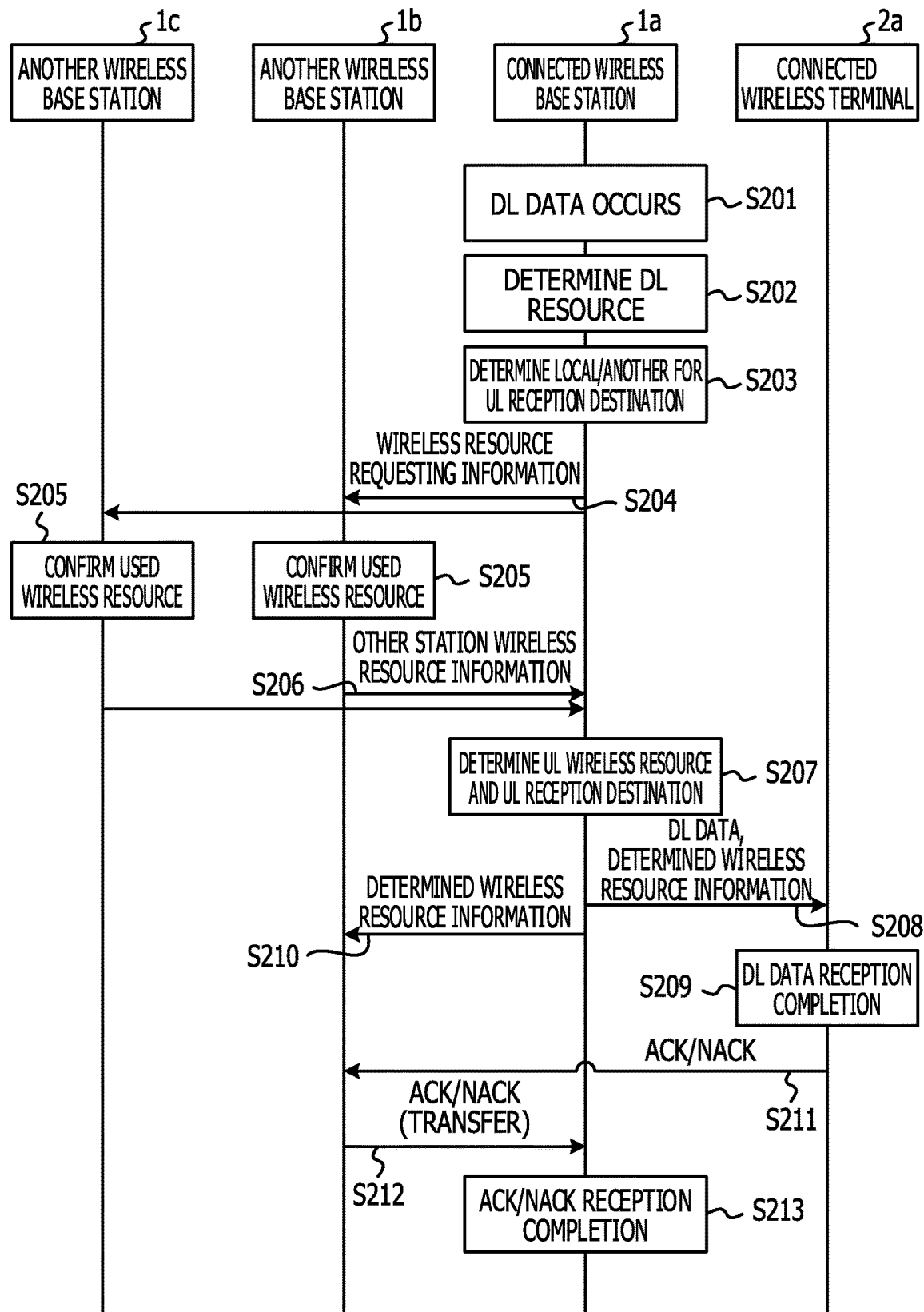
FIG. 9 is one example of a process sequence diagram of a wireless communication system in a second embodiment.

Based on FIG. 9, descriptions are given to a process sequence in the second embodiment. FIG. 9 corresponds to process, as described before, where sending data (DL data) to the subordinate wireless terminal 2a occurs in the wireless base station 1a.

In S201 in FIG. 9, firstly, DL data occurs in the connected wireless base station 1a. For example, DL data occurs when an audio signal, data, and the like are sent from the other wireless terminal 2b to the subordinate wireless terminal 2a, a server on the Internet sends data to the wireless terminal 2a, and the like.

In S202, as DL data occurs, the connected wireless base station 1a schedules a DL wireless resource to send the DL data to the wireless terminal 2a. Here, the scheduling of a DL wireless resource may use a general technique, so that the descriptions are omitted here.

Next, the connected wireless base station 1a schedules a UL wireless resource to receive a response signal (ACK/NACK signal) from the wireless terminal 2a that have received the DL data. This is carried out as below. The connected wireless base station 1a obtains the UL receiving quality from the wireless terminal 2a and determines whether or not to set a reception destination of the response signal as the local station based on the UL receiving quality in S203. In S204, as determining the base station to receive the UL data as any of the wireless base stations 1 other than the local station, the connected wireless base station 1a sends wireless resource requesting information to the other wireless base stations 1b, 1c via the transmission network. In contrast, the other wireless base stations 1b, 1c respectively obtain unused wireless resources in S205, and send other station wireless resource information including the unused wireless resources information to the connected wireless base station 1a via the transmission network in S206. Then, it is assumed that, in S207, the connected wireless base station 1a determines a UL wireless resource for the response signal and the other wireless base station 1b to be the UL sending destination. S203 through S207 are similar to S103 through S107, so that the details are omitted.

In S208 in FIG. 9, next, the connected wireless base station 1a sends determined wireless resource information, which is information indicating the selected UL wireless resource, to the subordinate wireless terminal 2a on a DL wireless signal. At this time, the connected wireless base station 1a in the second embodiment sends, in addition to the determined wireless resource information, DL data on a DL wireless signal as well.

Here, once leaving from FIG. 9, which is a process sequence of the second embodiment, descriptions are given to process when the connected wireless base station 1a sends DL data in a conventional LTE system. As scheduling a DL wireless resource to be assigned to DL data, the connected wireless base station 1a places (maps) the DL data in the DL wireless resource (resource block) on the DL frame. Together with this, the connected wireless base station 1a places a DCI (refer to FIG. 4), which is DL control information, in a predetermined region of the DL frame same as the DL data. As illustrated in FIG. 4, the DCI includes RB assignment, which is information indicating the DL wireless resource assigned to the DL data. Then, the connected wireless base station 1a sends a DL wireless signal including the DL frame to the wireless terminal 2a.

The descriptions for the conventional LTE system are continued. The wireless terminal 2a receives a DL wireless signal including the DL frame. The wireless terminal 2a recognizes (detects) the presence of DL data towards itself based on the RNTI included in the DCI in the DL frame, and recognizes (detects) that the scope of DCI application is the DL data (PDSCH) based on the DCI format. Further, the wireless terminal 2a extracts the DL data based on the RB assignment included in the DCI and carries out demodulation and decoding of the DL data based on the MCS included in the DCI. The wireless terminal 2a sends a response signal (an ACK signal indicating decoding success or a NACK signal indicating decoding failure) to the connected wireless base station 1a on a UL frame in accordance with the decoding result.

At this time, the wireless terminal 2a places the response signal in the UL frame corresponding to the placement of the DCI itself in the DL frame received earlier (note that it is not the placement indicated by the RB assignment in the DCI). Thus, the connected wireless base station 1a is capable of easily linking the sent DL data with the received response signal.

Specifically, the following specifications are defined in the LTE. Resource specification in the PUCCH (logical channel for a UL control signal) is carried out by a CCE (control channel element) number of the PDCCH (logical channel for a DL control signal) represented by a formula (1). In other words, specification of the UL wireless resource for ACK/NACK is carried out by placement of the DCI resource represented by a formula (1).

[Math 1]

$$n_{PUCCH}^{(1,\tilde{p}0)} = n_{CCE} + N_{PUCCH}^{(1)} \quad (1)$$

Here, $P_0$ is an antenna port, $n_{CCE}$ is a minimum CCE number used for sending of the corresponding DCI (for example, minimum CCE number upon configuring the PDCCH), and $N_{PUCCH}^{(1)}$ is a parameter notified by an upper layer. Although a CCE is a wireless resource unit that a RB is divided further, details are omitted.

Accordingly, in the conventional LTE system, the DL control information (DCI) related to the DL data and the UL control information (ACK/NACK) are only capable of using a mutually corresponding wireless resource. Accordingly, regarding control information related to the DL data, when the other wireless base station 1b uses a certain UL wireless resource R1, for example, the connected wireless base station 1a is not only incapable of using the UL wireless resource R1 (to avoid resource conflict) but also incapable of using a DL wireless resource R1. Even in a situation where the DL resources do not interfere with each other, the connected wireless base station 1a in this example has no option but to use a UL wireless resource R2 ($\neq$R1) and a DL wireless resource R2. Accordingly, in the conventional LTE system, scheduling for control information related to the DL data may be considered to be poor in flexibility.

With that, in the present embodiment, it is made possible to separate the correspondence relationship of the DL control information (DCI) related to DL data and the UL control information (ACK/NACK) and to allow assignment of a wireless resource that does not correspond mutually. Therefore, in the DCI, which is the DL control information, a region to store an offset in the placement (mapping) from the corresponding UL control information (referred to as a resource offset) is provided. Then, the wireless terminal 2a having received the DL data as well as the DCI places a response signal to the DL data in a wireless resource that is shifted by the resource offset stored in the DCI from the corresponding wireless resource of the DCI.

FIG. 10 illustrates one example of a DCI format according to the second embodiment. The DCI format in FIG. 10 includes the resource offset. The resource specification using the resource offset may be represented as a formula (2).

[Math 2]

$$n_{PUCCH}^{(1,\tilde{p}0)} = n_{CCE} + N_{PUCCH\_offset} \quad (2)$$

Here, $n_{PUCCH\_offset}$ is a resource offset of the PUCCH, and the unit is a CCE.

In such a manner, in the wireless communication system in the second embodiment, it is possible to assign a non-corresponding wireless resource to the DL control information (DCI) related to the DL data and the UL control information (ACK/NACK). For example, when the other wireless base station 1b uses a certain UL wireless resource R1 and a DL wireless resource R1, the connected wireless base station 1a is capable of using a UL wireless resource R2 (=R1+resource offset) and the DL wireless resource R1. Accordingly, in the wireless communication system in the present embodiment, it becomes possible to carry out flexible scheduling for the control information related to the DL data.

Back to the descriptions of FIG. 9, in S208, the connected wireless base station 1a sends the DCI, which is DL control information, and the DL frame including the DL data to the wireless terminal 2a. The DCI includes, in addition to the resource offset described before, the RNTI, the RB assignment related to the DL data, the MCS, and the like. Here, this resource offset corresponds to the determined wireless resource information (UL wireless resource for UL sending from the wireless terminal 2a to other wireless base station 1b).

In contrast, in S208, the wireless terminal 2a receives the DL frame sent by the connected wireless base station 1a. The wireless terminal 2a recognizes (detects) the presence of the DL data towards itself based on the RNTI included in the DCI in the DL frame, and recognizes (detects) that the scope of DCI application is the DL data (PDSCH) based on the DCI format. Further, the wireless terminal 2a extracts DL data based on RB assignment included in the DCI, and carries out demodulation and decoding of the DL data based on the MCS included in the DCI. Thus, in S209, the reception of DL data is completed. The resource offset included in the DCI is to be used when sending a UL control signal (ACK/NACK) and is not used here.

In S210 in FIG. 9, the connected wireless base station 1a sends determined wireless resource information to the other wireless base station 1b, which is a sending source of the unused wireless resource to be the origin of the determined wireless resource via the transmission network. Here, the determined wireless resource information sent by the connected wireless base station 1a corresponds to information indicating placement of adding the resource offset included in the DCI to the placement of the DCI included in the DL frame sent by the connected wireless base station 1a. S208 and S210 may be simultaneous or in the reverse order.

This completes the scheduling of the UL wireless resource to the wireless terminal 2a by the connected wireless base station 1a. In S203, when the connected wireless base station 1a determines the local station as the base station to receive UL data, regular UL wireless resource scheduling may be carried out (details are omitted).

In S211 in FIG. 9, in response to the decoding result of S208, the wireless terminal 2a sends a UL wireless signal including the UL frame where a response signal (ACK signal indicating decoding success or NACK signal indicating decoding failure), which is a UL control signal, is placed. At this time, the wireless terminal 2a of the present embodiment places a response signal in a UL frame using the resource offset included in the DCI as described before. Specifically, the wireless terminal 2a has placement of the response signal in the UL frame as placement where the resource offset included in the DCI is added to the placement of the DCI itself in the DL frame received earlier.

In contrast, in S211, the other wireless base station 1b receives a response signal, which is a UL control signal placed in the UL frame included in the UL wireless signal sent by the wireless terminal 2a. At this time, in S210, the other wireless base station 1b receives a response signal using the UL wireless resource indicated by the determined wireless resource information received from the connected wireless base station 1a. As described before, the determined wireless resource information received from the connected wireless base station 1a is the information indicating placement where the resource offset included in the DCI is added to the placement of the DCI included in the DL frame sent by the connected wireless base station 1a.

Lastly, in S212, the other wireless base station 1b sends (transfers) the response signal included in the received UL wireless signal to the connected wireless base station 1a via the transmission network. This completes the reception of a response signal (ACK/NACK) in the connected wireless base station 1a in S213.

As described above based on FIGS. 9 and 10, in the wireless communication system of the second embodiment, correspondence relationship related to the placement of the DL control information (DCI) related to the DL data and the UL control information (ACK/NACK) is separated and sends the information related to the placement of the corresponding UL control information in the DL control information. Thus, the wireless communication system in the second embodiment exhibits, in addition to the effect obtained in the wireless communication system in the first embodiment, an effect of allowing flexible scheduling to the control information related to the DL data.

The functional configuration and the hardware configuration of the respective device in the second embodiment follow those in the first embodiment, so that the description is omitted.

[d] Third Embodiment

The third embodiment is a modification that is applicable to the first embodiment or the second embodiment, and the connected wireless base station 1a selects the other wireless base station 1b, which is a UL sending destination, based on the UL receiving quality notified in advance from the other wireless base stations 1b.

In the following descriptions, descriptions are given to a modification where the third embodiment is applied to the first embodiment. Since this modification has many points in common with the first embodiment, descriptions are given mainly to the points different from the first embodiment in the following descriptions. As described before, although the third embodiment may be modified by applying to the second embodiment, it may be applied similarly to that to the first embodiment and the details are omitted.

Figure 11:
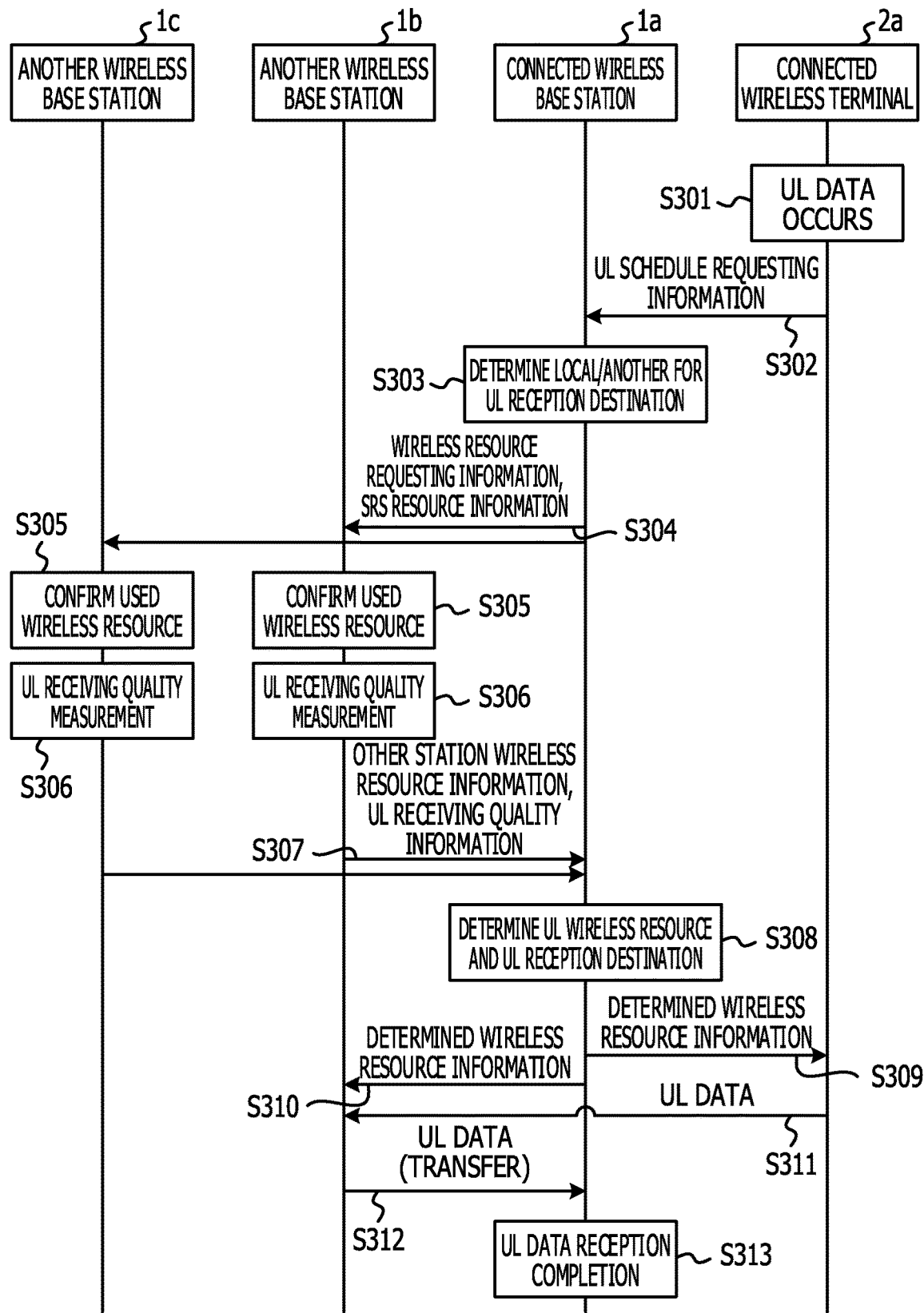
FIG. 11 is one example of a process sequence diagram of a wireless communication system in a third embodiment.

Based on FIG. 11, descriptions are given to a process sequence of a modification where the third embodiment is applied to the first embodiment. Since S301 through S303 in FIG. 11 are similar to S101 through S103 in FIG. 3, the description is omitted. In S304, the connected wireless base station 1a sends, in addition to wireless resource requesting information (similar to S104 in FIG. 3), SRS resource information to the other wireless base stations 1b, 1c. Here, the SRS resource information indicates resource information to be used for reception of an SRS, which is a UL reference signal for UL receiving quality measurement generated by the wireless terminal 2a. The SRS resource information includes, for example, an RB to which an SRS is assigned, data series information of an SRS, and the like. Since the generated SRS is different for each wireless terminal 2, only the connected wireless base station 1a that regularly recognizes the SRS resource information is capable of receiving it. By obtaining the SRS resource information, the other wireless base stations 1b, 1c become capable of receiving an SRS.

In S305 in FIG. 11, the other wireless base stations 1b, 1c confirm a used wireless resource (similar to S105 in FIG. 3). Next, in S306, the other wireless base stations 1b, 1c receive an SRS from the wireless terminal 2a using the SRS resource information and measures the UL receiving quality. Then, in S307, the other wireless base stations 1b, 1c send, in addition to the other station wireless resource information (similar to S106 in FIG. 3), the UL receiving quality information measured in S306 to the connected wireless base station 1a.

In S308 in FIG. 11, the connected wireless base station 1a is capable of using the received UL receiving quality information in the determination of UL reception destination and UL resource. As an example, the connected wireless base station 1a is capable of determining, among the other wireless base stations 1b, 1c capable of securing the UL wireless resource in the amount requested in the UL schedule requesting information (this is obtained by the other station wireless resource information), that having best receiving quality indicated by the received UL receiving quality information as the UL reception destination. Since S309 through S313 in FIG. 11 are similar to S108 through S112 in FIG. 3, the description is omitted.

As descriptions are given above based on FIG. 11, in the wireless communication system of the third embodiment, the connected wireless base station 1a selects the other wireless base station 1b, which is the UL sending destination, based on the UL receiving quality notified in advance from the other wireless base stations 1b, 1c. In addition, therefore, the connected wireless base station 1a sends the SRS resource information to the other wireless base stations 1b, 1c in advance. Thus, the wireless communication system in the third embodiment exhibits, in addition to an effect obtained by the wireless communication system in the first embodiment, an effect of allowing selection of the other wireless base stations 1b, 1c having good UL receiving quality as the UL sending destination.

The functional configuration and the hardware configuration of the respective device in the third embodiment follow those in the first embodiment, so that the description is omitted.

[e] Fourth Embodiment

The fourth embodiment is a modification that is applicable to as any of the first embodiment through the third embodiment, and the connected wireless base station 1a notifies the other wireless base stations 1b, 1c in advance of a wireless resource amount to be used for the UL sending of the wireless terminal 2a.

In the following descriptions, descriptions are given to a modification where the fourth embodiment is applied to the first embodiment. Since this modification has many points in common with the first embodiment, descriptions are given mainly to the points different from the first embodiment in the following descriptions. As described before, although the fourth embodiment may be modified by applying to the second embodiment or the third embodiment, it may be applied similarly to that to the first embodiment and the details are omitted.

Figure 12:
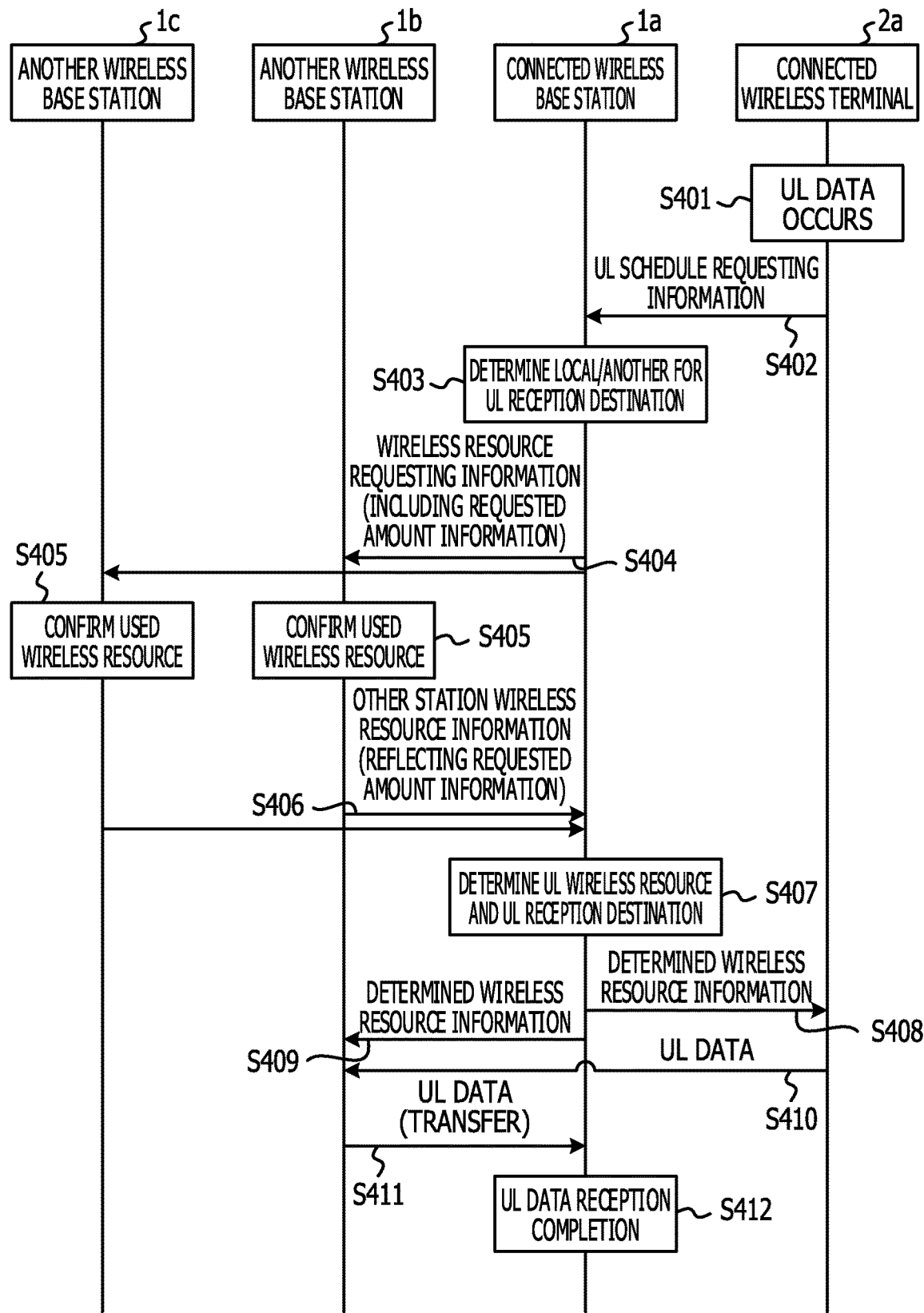
FIG. 12 is one example of a process sequence diagram of a wireless communication system in a fourth embodiment.

Based on FIG. 12, descriptions are given to a process sequence of a modification where the fourth embodiment is applied to the first embodiment.

Since S401 through S403 in FIG. 12 are similar to S101 through S103 in FIG. 3, the description is omitted. In S404 in FIG. 12, the connected wireless base station 1a sends wireless resource requesting information, which is information to request a UL wireless resource, to the other wireless base stations 1b, 1c via the transmission network. At this time, the connected wireless base station 1a in the present embodiment stores requested amount information of the UL wireless resource included in the UL schedule requesting information received in S402 in the wireless resource requesting information for sending.

In S405 in FIG. 12, as receiving wireless resource requesting information respectively, the other wireless base stations 1b, 1c obtain unused wireless resources. At this time, the other wireless base stations 1b, 1c in the present embodiment obtain the unused wireless resources of the requested amount based on the UL wireless resource amount information included in the received wireless resource requesting information. In S406, the other wireless base stations 1b, 1c send other station wireless resource information including unused wireless resources information indicating the obtained unused wireless resources to the connected wireless base station 1a via the transmission network, respectively. The other station wireless resource information sent in S406 satisfies the requested amount (of the UL wireless resource) included in the wireless resource requesting information received in S404.

In S406, the connected wireless base station 1a receives other station wireless resource information including the unused wireless resources information respectively from the other wireless base stations 1b, 1c. Then, in S407, the connected wireless base station 1a selects the UL wireless resource that is used for UL data sending from the wireless terminal 2a based on the received unused wireless resources information. Here, the connected wireless base station 1a in the first embodiment arbitrarily selects unused wireless resources of the requested wireless resource amount based on the received unused wireless resources information in S107 in FIG. 3. In contrast, the unused wireless resources information received by the connected wireless base station 1a of the present embodiment indicates unused wireless resources of the requested wireless resource amount. Therefore, the connected wireless base station 1a in the present embodiment may select one item of the unused wireless resources information received respectively from the other wireless base stations 1b, 1c in S407. That is, in the connected wireless base station 1a of the present embodiment, selection of the UL wireless resource based on the unused wireless resources and selection of the other wireless base station 1b to be a sending destination of UL sending are equivalent. Here, it is assumed that the connected wireless base station 1a selects the unused wireless resources of the other wireless base station 1b as the UL wireless resource.

In S408 in FIG. 12, the connected wireless base station 1a sends the determined wireless resource information to the wireless terminal 2a (similar to S108 in FIG. 3). In S409, the connected wireless base station 1a sends response information indicating to be selected as the other wireless base station 1b to be a sending destination of UL sending to the other wireless base station 1b to be the sending destination of the UL sending. Here, the connected wireless base station 1a in the present embodiment, different from the connected wireless base station 1a in the first embodiment, does not have to notify the other wireless base station 1b of information indicating the selected unused wireless resources. This is because the other wireless base station 1b recognizes the selected unused wireless resources. Since S410 through S412 in FIG. 12 are same as S110 through S112 in FIG. 3, the description is omitted.

In the fourth embodiment, compared with the first embodiment, although a size of wireless resource requesting information is slightly greater for including the UL wireless resource amount information, the other station wireless resource information (unused wireless resources information) may be same or smaller. In addition, the connected wireless base station 1a may send, instead of the determined wireless resource information, the response information. Accordingly, according to the fourth embodiment, compared with the first embodiment, an effect of suppressing the information amount sent and received between the wireless base stations 1 is expected.

The functional configuration and the hardware configuration of the respective device in the fourth embodiment follow those in the first embodiment, so that the description is omitted.

[f] Fifth Embodiment

The fifth embodiment is a modification that is applicable to any of the first embodiment through the third embodiment, and the connected wireless base station 1a notifies of, without obtaining other station wireless resource information from the other wireless base stations 1b, 1c, a UL wireless resource used for the UL sending from the wireless terminal 2a. In other words, the connected wireless base station 1a notifies the other wireless base stations 1b, 1c one-sidedly of the UL wireless resource used for the UL sending from the wireless terminal 2a.

In the following descriptions, descriptions are given to a modification where the fifth embodiment is applied to the first embodiment. Since this modification has many points in common with the first embodiment, descriptions are given mainly to the points different from the first embodiment in the following descriptions. As described before, although the fifth embodiment may be modified by applying to the second embodiment or the third embodiment, it may be applied similarly to that to the first embodiment and the details are omitted.

Figure 13:
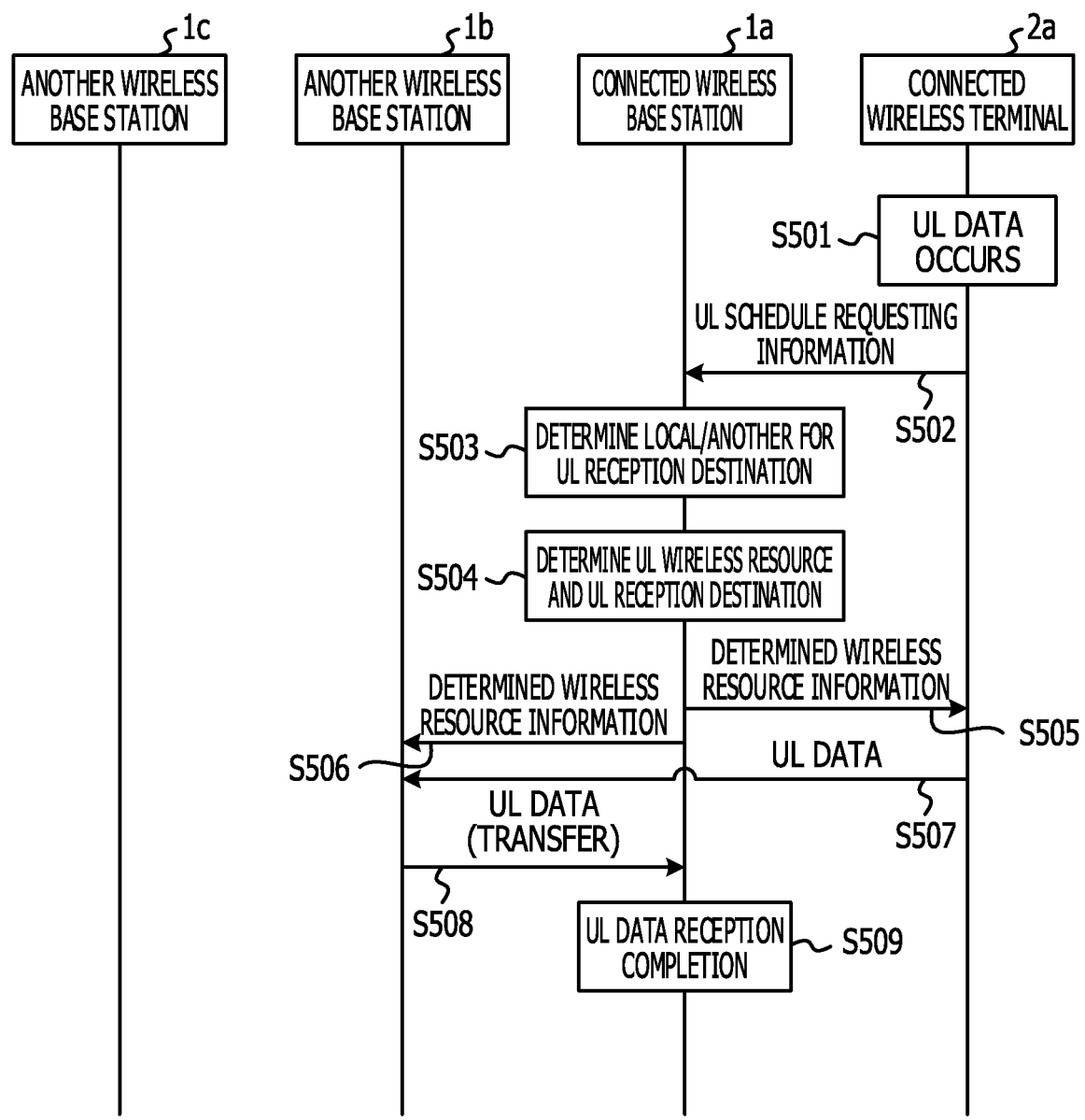
FIG. 13 is one example of a process sequence diagram of a wireless communication system in a fifth embodiment.

Based on FIG. 13, descriptions are given to a process sequence of a modification where the fifth embodiment is applied to the first embodiment.

Since S501 through S503 in FIG. 13 is similar to S101 through S103 in FIG. 3, the description is omitted. When the UL reception destination is determined as other than the local station in S503, the connected wireless base station 1a further determines a UL wireless resource and a UL reception destination used for the UL reception in S504. The connected wireless base station 1a is capable of determining the UL wireless resource and the UL reception destination used for the UL reception in an arbitrary method.

In S505, the connected wireless base station 1a sends the determined UL wireless resource to the wireless terminal 2a (similar to S108 in FIG. 3). Then, in S506, the connected wireless base station 1a sends wireless resource requesting information, which is the information to request the determined UL wireless resource, to the other wireless base station 1b, which is the determined UL sending destination, via the transmission network. Since S507 through S509 in FIG. 13 are similar to S110 through S112 in FIG. 3, the description is omitted.

In the fifth embodiment, compared with the first embodiment, the other station wireless resource information (unused wireless resources information) becomes not requested and the information sent from the connected wireless base station 1a to the other wireless base station 1b is also reduced. Accordingly, according to the fifth embodiment, compared with the first embodiment, an effect of suppressing the information amount sent and received between the wireless base stations 1 is expected.

The functional configuration and the hardware configuration of the respective device in the fifth embodiment follow those in the first embodiment, so that the description is omitted.

[g] Sixth Embodiment

The sixth embodiment is a modification that is applicable to as any of the first embodiment through the third embodiment, and the other wireless base stations 1b, 1c sense an event to be an opportunity, thereby sending other station wireless resource information to the connected wireless base station 1a. In other words, without sending wireless resource requesting information from the connected wireless base station 1a to the other station wireless base stations 1b, 1c, the other station wireless base stations 1b, 1c send other station wireless resource information to the connected wireless base station 1a.

In the following descriptions, descriptions are given to a modification where the sixth embodiment is applied to the first embodiment. Since this modification has many points in common with the first embodiment, descriptions are given mainly to the points different from the first embodiment in the following descriptions. As described before, although the sixth embodiment may be modified by applying to the second embodiment or the third embodiment, it may be applied similarly to that to the first embodiment and the details are omitted.

Figure 14:
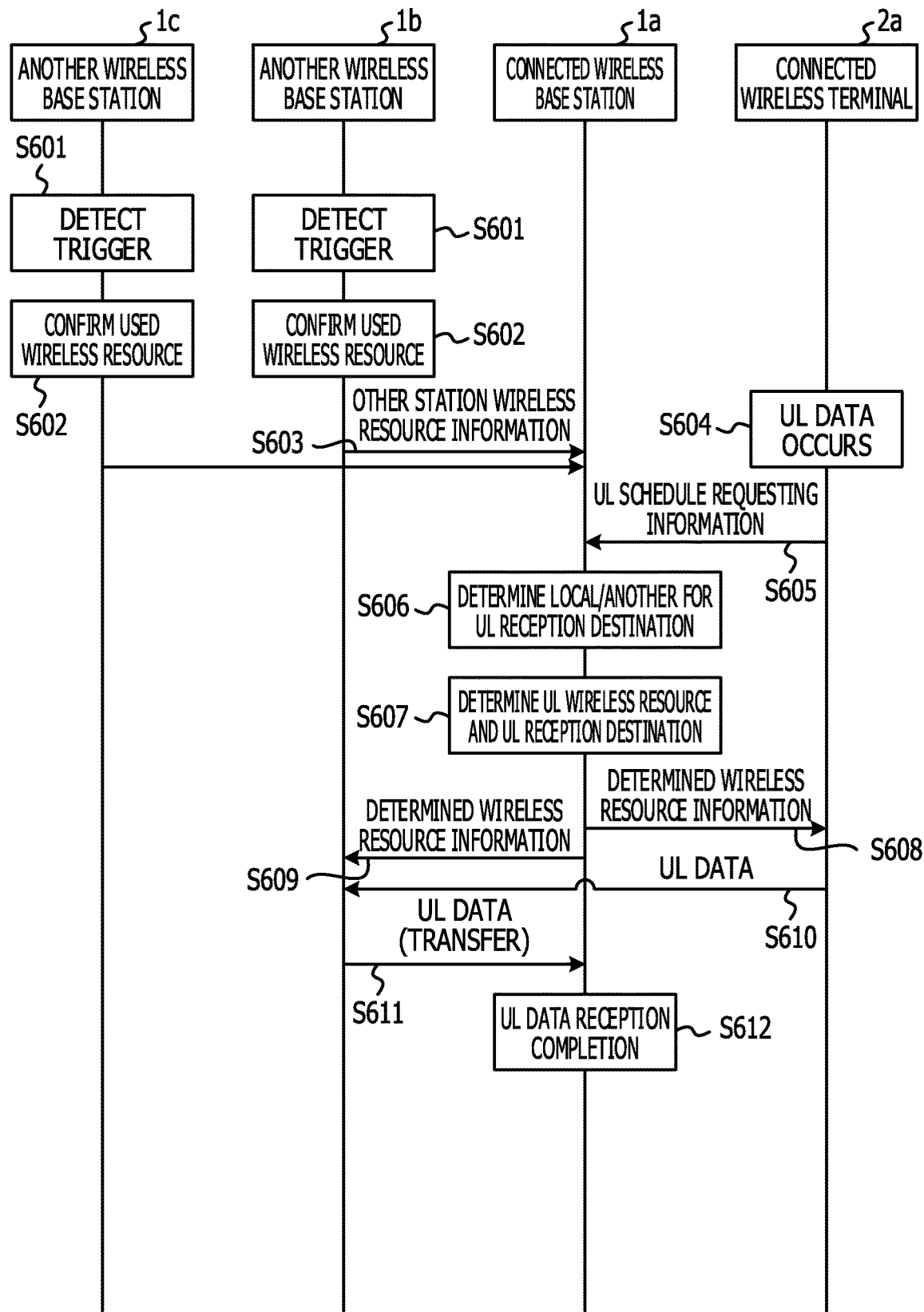
FIG. 14 is one example of a process sequence diagram of a wireless communication system in a sixth embodiment.

Based on FIG. 14, descriptions are given to a process sequence of a modification where the sixth embodiment is applied to the first embodiment.

In S601 in FIG. 14, the other wireless base stations 1b, 1c sense a predetermined event to be a trigger (opportunity) to send other station wireless resource information. This event may be an arbitrary event and may be, as an example, a lapse of predetermined time from the last sending of the other station wireless resource information. As another example, it may be the UL wireless used resource amount in the other wireless base stations 1b, 1c at a predetermined value or less. Then, in S602 and S603, the other station wireless base stations 1b, 1c confirm the used wireless resource and send the other station wireless resource information (similar to S105 and S106 in FIG. 3).

In addition, in S604 through S606 in FIG. 14, UL data occurs in the wireless terminal 2a, and the wireless terminal 2a sends UL schedule requesting information and the connected wireless base station 1a determines whether or not to set the UL reception destination as the local station (similar to S101 through S103 in FIG. 3). Then, when the UL reception destination is determined as other than the local station in S606, the connected wireless base station 1a determines, in S607, a UL wireless resource and a UL reception destination based on the other station wireless resource information received in S603. Since S607 through S612 in FIG. 14 are similar to S107 through S112 in FIG. 3, the description is omitted. Although S601 through S603 in FIG. 14 are carried out at a timing before S605, they do not have to be so and S601 through S603 may be at any timing as long as before S607.

In the sixth embodiment, compared with the first embodiment, the wireless resource requesting information becomes not requested. Accordingly, according to the sixth embodiment, compared with the first embodiment, an effect of suppressing information amount sent and received between the wireless base stations 1 is expected.

The functional configuration and the hardware configuration of the respective device in the sixth embodiment follow those in the first embodiment, so that the description is omitted.

[h] Seventh Embodiment

In the seventh embodiment, the wireless terminal 2a generates and sends a DM-RS, which is one of the UL reference signals, in accordance with the other wireless base station 1b, which is a UL sending destination. It is possible to combine the seventh embodiment with the first embodiment or the second embodiment, and there are many points in common with them. In the following descriptions, descriptions are given mainly to the points in the seventh embodiment different from the first embodiment in the following descriptions.

In a conventional LTE system and the wireless communication system of the first embodiment, when sending a UL wireless frame, the wireless terminal 2a generates a DM-RS, which is one of the UL reference signal, and maps it in a UL wireless frame for sending. The connected wireless base station 1a that has received the UL wireless frame demodulates the UL control signal and the data signal using channel characteristics to estimate the channel characteristics based on the DM-RS.

Here, the DM-RS is information (pattern) different for each wireless base station 1. Specifically, the DM-RS is generated based on a base station identifier. In a regular LTE system, the wireless terminal 2a generates a DM-RS for the connected wireless base station 1a using the identifier of the connected wireless base station 1a and sends it in a UL wireless frame. Then, the connected wireless base station 1a carries out channel estimation by analyzing the DM-RS in the received UL wireless frame using the identifier of the connected wireless base station 1a. Thus, the connected wireless base station 1a is capable of appropriately receiving the DM-RS and capable of estimating the channel characteristics with high precision, so that decoding errors are suppressed.

However, a problem occurs in the first embodiment and the second embodiment when the UL sending destination of the wireless terminal 2a becomes the other wireless base station 1b. Even when the wireless terminal 2a sends the DM-RS towards the connected wireless base station 1a, the other wireless base station 1b receives the DM-RS and utilizes it for demodulation. Since the DM-RS towards the other wireless base station 1b is generally different from the DM-RS towards the connected wireless base station 1a, the other wireless base station 1b is not capable of appropriately estimating the channel characteristics based on the DM-RS. In this case, it turns out to increase decoding errors and thus not preferred.

In order to solve this problem, in the seventh embodiment, when the UL sending destination of the subordinate wireless terminal 2a is the other wireless base station 1b, the connected wireless base station 1a stores an identifier of the other wireless base station 1b in the DL control information (DCI) for sending. Then, the wireless terminal 2a having received the DL wireless frame, when sending the UL wireless frame, generates the DM-RS using the identifier of the other wireless base station 1b and maps the DM-RS in the UL wireless frame for sending.

FIG. 15 illustrates a DCI format in the seventh embodiment. FIG. 15 (A) is a DCI format of a modification where the seventh embodiment is applied to the first embodiment. FIG. 15 (B) is a DCI format of a modification where the seventh embodiment is applied to the second embodiment. The DCI formats in FIG. 15 both have a region to store a UL sending destination identifier, which is an identifier of the other wireless base station 1b.

According to the seventh embodiment, the wireless terminal 2a is capable of generating and sending the DM-RS towards the other wireless base station 1b, so that an effect of suppressing decoding errors in the other wireless base station 1b is obtained.

The functional configuration and the hardware configuration of the respective device in the seventh embodiment follow those in the first embodiment, so that the description is omitted.

[i] Eighth Embodiment

The eighth embodiment is also to solve the problem same as the seventh embodiment, and it is possible to combine with the first embodiment or the second embodiment. Since the eighth embodiment has many points in common with the seventh embodiment, descriptions are given mainly to the points in the eighth embodiment different from the seventh embodiment in the following descriptions.

In the eighth embodiment, it does not have to store an identifier of the other wireless base station 1b in the DCI as in the seventh embodiment. Instead, in the eighth embodiment, the other wireless base station 1b analyzes the DM-RS in the received UL wireless frame using the identifier of the connected wireless base station 1a (not the identifier of itself) and carries out channel estimation. The other wireless base station 1b is capable of learning the identifier of the connected wireless base station 1a in a message sent and received with the connected wireless base station 1a.

According to the eighth embodiment, the other wireless base station 1b is capable of appropriately receiving the DM-RS towards the connected wireless base station 1a and capable of estimating the channel characteristics with high precision, so that an effect of suppressing decoding errors is obtained. Comparing the seventh embodiment with the eighth embodiment, the former has to use a function compatible with both the wireless base stations 1 and the wireless terminals 2, while the latter has to use a function compatible only with the wireless base stations 1, so that the latter is considered to be easier for introduction.

The functional configuration and the hardware configuration of the respective device in the eighth embodiment follow those in the first embodiment, so that the description is omitted.

[j] Ninth Embodiment

The ninth embodiment is also to solve the problem same as the seventh embodiment and the eighth embodiment, and it is possible to combine with the first embodiment or the second embodiment. The ninth embodiment is equivalent to an embodiment in which the seventh embodiment and the eighth embodiment are combined.

When an identifier of the other wireless base station 1b is stored in the DCI in the received DL wireless frame, the wireless terminal 2a in the present embodiment generates the DM-RS using the identifier of the other wireless base station 1b. At this time, the other wireless base station 1b analyzes the DM-RS in the UL wireless frame received as regularly using the identifier of itself and carries out channel estimation.

In contrast, when the identifier of the other wireless base station 1b is not stored in the DCI, the wireless terminal 2a generates the DM-RS using an identifier of the connected wireless base station 1a. At this time, the other wireless base station 1b analyzes the DM-RS in the received UL wireless frame using the identifier of the connected wireless terminal 2a and carries out channel estimation.

The other wireless base station 1b is regularly not capable of learning whether or not an identifier of the other wireless base station 1b is stored in the DCI. Therefore, the other wireless base station 1b has to be notified of whether or not the identifier of the other wireless base station 1b is stored in the DCI from the connected wireless base station 1a in advance.

By the ninth embodiment as well, similar to the seventh and eighth embodiments, an effect of suppressing decoding errors in the other wireless base station 1b is obtained.

The functional configuration and the hardware configuration of the respective device in the ninth embodiment follow those in the first embodiment, so that the description is omitted.

[k] Other Embodiments

In the first through ninth embodiments described above, when the wireless terminal 2a is UL sent to the other wireless base station 1b, the connected wireless base station 1a carries out determination of the other wireless base station 1b to be the destination (determined wireless base station) and the UL wireless resource to be used (determined wireless resource). However, the subject of such determination is not limited to the connected wireless base station 1a.

For example, an upper station (upper device) connected to the core network and the like may also determine the determined wireless base station and the determined wireless resource. In addition, the other wireless base station 1b different from the connected wireless base station 1a may also determine the determined wireless base station and the determined wireless resource. Further, the wireless terminal 2a may also determine the determined wireless base station and the determined wireless resource.

Further, an upper station (upper device), the other wireless base station 1b, the wireless terminal 2a, and the like may also receive other station wireless resource information from the other wireless base stations 1b, 1c in a procedure similar to that carried out by the connected wireless base station 1a in the first through ninth embodiments described above. Then, the upper station (upper device), the other wireless base station 1b, wireless terminal 2a, and the like may also determine the determined wireless base station and the determined wireless resource based on the received other station wireless resource information.

By the way, in this application, for example, "connected to" is able to be replaced with "coupled to". Moreover, for example, when an element is referred to as being "connected to" or "coupled to" another element, it can be not only directly but also indirectly connected or coupled to the other element (namely, intervening elements may be present). So do "connecting to", "coupling to", "connection to", "coupling to" and so on.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A wireless communication system comprising a first base station, at least two second base stations, and a terminal, the first base station including a first processor and a first memory coupled to the first processor, the first memory storing a plurality of instructions, wherein the first processor is configured to execute the instructions to:

measure a first uplink receiving quality based on a first uplink reference signal transmitted by the terminal;

receive from the at least two second base stations, second uplink receiving qualities measured by the at least two second base stations based on a second uplink reference signal transmitted by the terminal;

select among the at least two second base stations, a base station to which the terminal transmits uplink data based on the second uplink receiving qualities and select an uplink radio resource used by the terminal when the terminal transmits in an uplink, the uplink data to the selected base station, based on the second uplink receiving qualities; and notify the terminal of control information relating to the selected base station and the uplink radio resource;

each of the at least two second base stations including a second processor and a second memory coupled to the second processor, the second memory storing a plurality of instructions, wherein the second processor is configured to execute the instructions to:

measure the second uplink receiving quality based on the second uplink reference signal transmitted by the terminal, and notify the first base station of the measured second uplink receiving quality; and the terminal including a third processor, a third memory coupled to the third processor, the third memory storing a plurality of instructions, and a transmitter coupled to the third processor wherein the third processor is configured to execute the instructions to receive the control information about the selected base station and the uplink radio resource notified from the first base station, and the transmitter is configured to transmit the first uplink reference signal to the first base station, to transmit the second uplink reference signal to the at least two second base stations, and to transmit the uplink data to only the selected base station by using the uplink radio resource related to the control information notified from the first base station.

2. A first base station comprising a first processor and a first memory coupled to the first processor, the first memory storing a plurality of instructions, wherein the first processor is configured to execute the instructions to:

measure a first uplink receiving quality based on a first uplink reference signal transmitted by a terminal;

receive from at least two second base stations, second uplink receiving qualities measured by the at least two second base stations based on a second uplink reference signal transmitted by the terminal;

select among the at least two second base stations, a base station to which the terminal transmits uplink data based on the second uplink receiving qualities, and select an uplink radio resource used by the terminal when the terminal transmits in an uplink, the uplink data to the selected base station based on the second uplink receiving qualities;

notify the terminal of control information relating to the selected base station and the uplink radio resource; and receive the uplink data from the terminal via only the selected base station by using the uplink radio resource related to the control information notified by the first base station.

3. A terminal comprising:

a processor;

a memory coupled to the processor, the memory storing a plurality of instructions; and a transmitter and a receiver coupled to the third processor, wherein the transmitter is configured to transmit a first uplink reference signal to a first base station to measure a first uplink receiving quality based on the first uplink reference signal by the first base station, to transmit at least one second uplink reference signal to at least two second base stations to measure a second uplink receiving qualities based on the second uplink reference signal by the at least two second base stations, the second uplink receiving qualities being used by the first base station to select a base station to which the terminal transmits uplink data, the receiver is configured to receive control information about a selected base station and an uplink radio resource notified from the first base station, and the processor is configured to execute the instructions to transmit uplink data to a selected base station, by using an uplink radio resource notified from the first base station.

4. A wireless communication method for a system including a first base station, at least two second base stations and a terminal, comprising:

measuring by the first base station, a first uplink receiving quality based on a first uplink reference signal transmitted by the terminal;

receiving by the first base station from the at least two second base stations, second uplink receiving qualities measured by the at least two second base stations based on a second uplink reference signal transmitted by the terminal;

selecting by the first base station among the at least two second base stations, a base station to which the terminal transmits uplink data based on the second uplink receiving qualities;

selecting by the first base station, an uplink radio resource used by the terminal when the terminal transmits in an uplink, the uplink data to the selected base station based on the second uplink receiving qualities;

notifying by the first base station, the terminal of control information relating to the selected base station and the uplink radio resource;

measuring by each of the at least two second base stations, the second uplink receiving quality based on the second uplink reference signal transmitted by the terminal;

notifying by the at least one second base station, the first base station of the measured at least one second uplink receiving quality;

transmitting by the terminal, the first uplink reference signal to the first base station;

transmitting by the terminal, the second uplink reference signal to the at least two second base stations;

receiving by the terminal, the control information about the selected base station and the uplink radio resource notified from the first base station; and transmitting by the terminal, the uplink data to only the selected base station, by using the uplink radio resource related to the control information notified from the first base station.

\* \* \* \* \*